United States Patent
Sayeed et al.

(10) Patent No.: US 9,444,532 B1
(45) Date of Patent: Sep. 13, 2016

(54) WIDEBAND TRANSCEIVER FOR ANTENNA ARRAY

(71) Applicant: Wisconsin Alumni Research Foundation, Madison, WI (US)

(72) Inventors: Akbar M. Sayeed, Madison, WI (US); John H. Brady, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 14/628,382

(22) Filed: Feb. 23, 2015

(51) Int. Cl.
*H04L 1/02* (2006.01)
*H04B 7/04* (2006.01)

(52) U.S. Cl.
CPC .......... *H04B 7/043* (2013.01); *H04B 7/0456* (2013.01)

(58) Field of Classification Search
CPC ... H04L 1/0618; H04L 1/06; H04L 27/2647; H04L 5/0007; H04B 3/54
USPC ........................................ 375/267, 259, 260
See application file for complete search history.

(56) References Cited

U.S. PATENT DOCUMENTS

| | | | |
|---|---|---|---|
| 2003/0190897 A1* | 10/2003 | Lei ................. | H04B 7/0408 455/101 |
| 2011/0241931 A1* | 10/2011 | Krich ................. | G01S 7/2813 342/159 |

* cited by examiner

*Primary Examiner* — Helene Tayong
(74) *Attorney, Agent, or Firm* — Bell & Manning, LLC

(57) ABSTRACT

Beam measurement values are computed by transforming a signal to a beamspace representation using a beamforming matrix that includes a plurality of columns that define a plurality of beams. A second plurality of beams is selected from the plurality of beams based on a power captured by each beam derived from the computed beam measurement values. For each beam of the second plurality of beams as a first beam, a spatial phase shift component and a temporal delay component is computed based on the fixed spatial angle associated with the first beam and a carrier frequency, a filter is defined using the spatial phase shift component and the temporal delay component, a beam measurement value associated with the first beam from the computed beam measurement values is selected, and the defined filter is applied to the selected beam measurement value to define a filtered value.

20 Claims, 14 Drawing Sheets

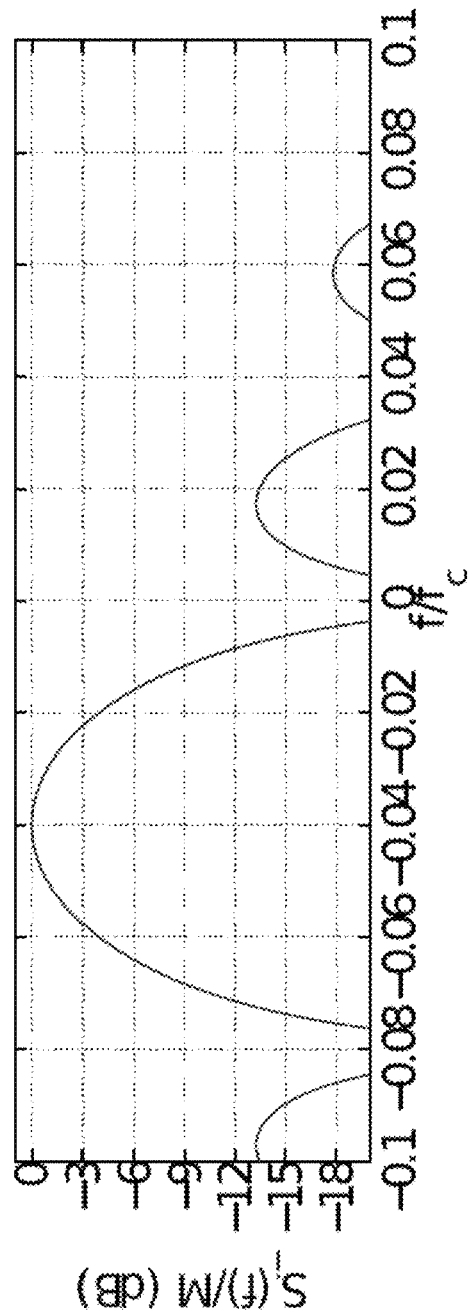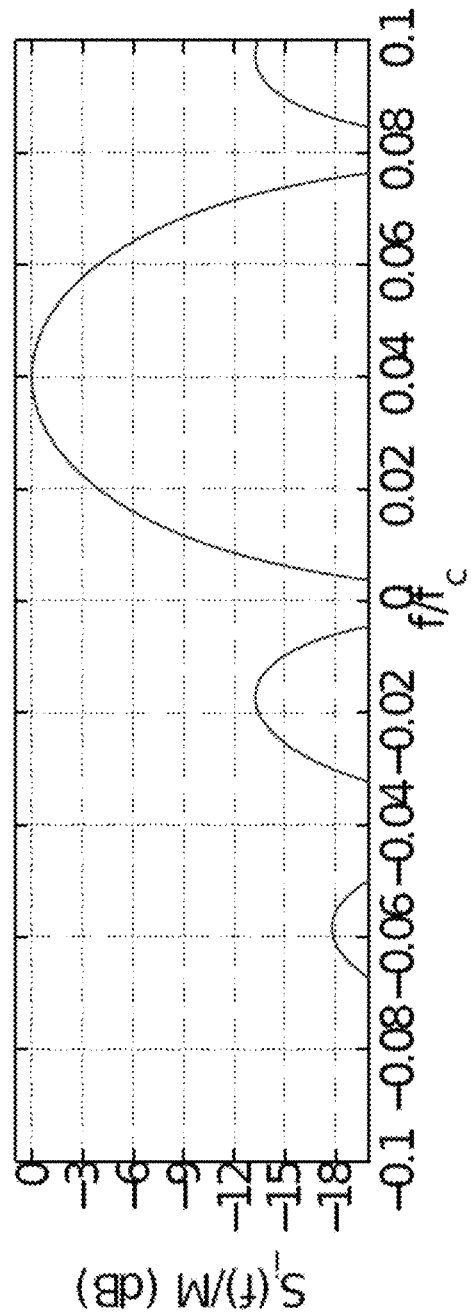

US 9,444,532 B1

WIDEBAND TRANSCEIVER FOR ANTENNA ARRAY

REFERENCE TO GOVERNMENT RIGHTS

This invention was made with government support under 1247583 awarded by the National Science Foundation. The government has certain rights in the invention.

BACKGROUND

Wideband high-dimensional antenna arrays are expected to play a key role in future wireless systems. Due to narrow beamwidths, phased array/beamforming methods are the natural choice for design and analysis of high-dimensional multiple-input, multiple-output (MIMO) systems. However, these methods are based on a narrowband assumption that is violated as the bandwidth and array dimension increase.

SUMMARY

A method of processing a communication signal is provided. A plurality of beam measurement values are computed by transforming a signal received from each antenna of a plurality of antennas to a beamspace representation using a beamforming matrix that includes a plurality of columns that define a plurality of beams. Each column of the plurality of columns defines a steering vector for a beam that corresponds to a fixed spatial angle relative to a boresight vector extending from the plurality of antennas. A second plurality of beams is selected from the plurality of beams based on a power captured by each beam of the plurality of beams derived from the computed plurality of beam measurement values. For each beam of the selected second plurality of beams as a first beam, a spatial phase shift component is computed based on the fixed spatial angle associated with the first beam and a carrier frequency, a temporal delay component is computed based on the fixed spatial angle associated with the first beam and the carrier frequency, a filter is defined using the spatial phase shift component and the temporal delay component, a beam measurement value associated with the first beam is selected from the computed plurality of beam measurement values, and the defined filter is applied to the selected beam measurement value to define a filtered value. The defined filtered values are combined.

In another example embodiment, a receiver is provided that includes a processor configured to perform the method of processing a communication signal.

In yet another example embodiment, a transmitter is provided that includes a plurality of antennas configured to receive a first signal and to transmit a second signal and a processor configured to compute a plurality of beam measurement values by transforming the first signal to a beamspace representation using a beamforming matrix. The beamforming matrix includes a plurality of columns, wherein each column of the plurality of columns defines a steering vector for a beam that corresponds to a fixed spatial angle relative to a boresight vector extending from the plurality of antennas. The plurality of columns thereby define a plurality of beams. The processor is further configured to select a second plurality of beams from the defined plurality of beams based on a power captured by each beam of the plurality of beams that is derived from the computed plurality of beam measurement values. For each beam of the selected second plurality of beams as a first beam, the processor is further configured to compute a spatial phase shift component based on the fixed spatial angle associated with the first beam and a carrier frequency, to compute a temporal delay component based on the fixed spatial angle associated with the first beam and the carrier frequency, and to define a filter using the computed spatial phase shift component and the computed temporal delay component. The processor is further configured to filter a transmit signal through each defined filter, to process the filtered signals through the beamforming matrix, and to transmit the processed, filtered signals from the plurality of antennas as the second signal.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 5a-5e show plots of $S_i(f)$ for an M=61 antenna array for $i_o$=25 as a function of a normalized frequency for five values of i centered on $i_o$. FIG. 5a shows $S_i(f)$ for i=25; FIG. 5b shows $S_i(f)$ for i=24; FIG. 5c shows $S_i(f)$ for i=26; FIG. 5d shows $S_i(f)$ for i=23; and FIG. 5d shows $S_i(f)$ for i=27.

DETAILED DESCRIPTION

Figure 1:
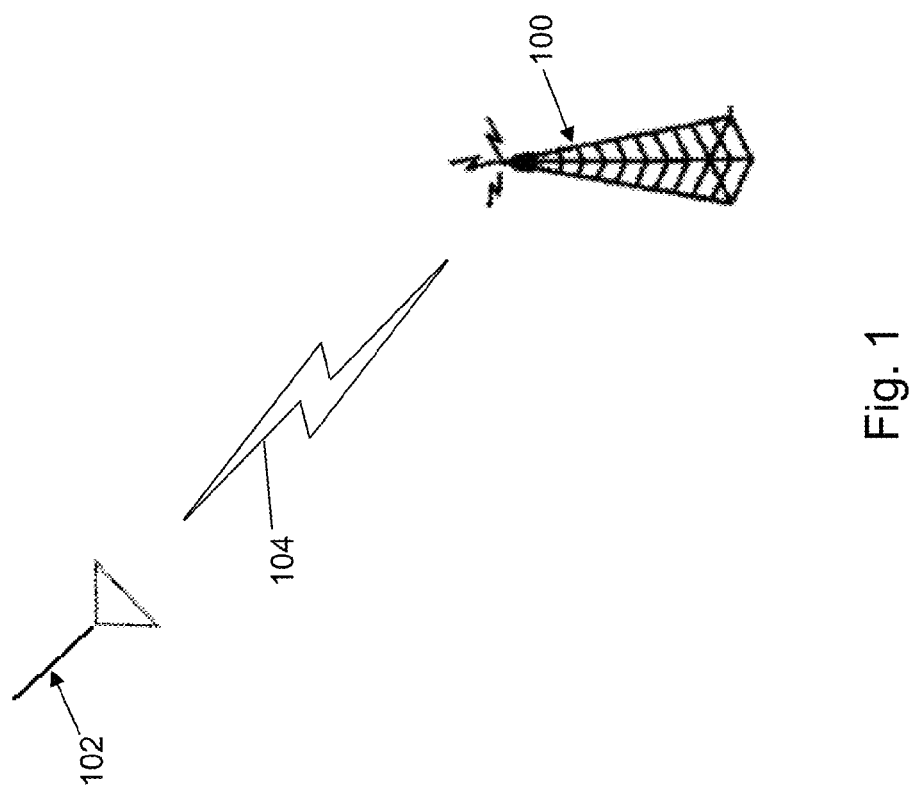
FIG. 1 depicts a communication system in accordance with an illustrative embodiment.

Referring to FIG. 1, in an illustrative communication system, there is a line-of-sight (LoS) path between a first transceiver 100 and a second transceiver 102 that represents clear spatial channel characteristics though first transceiver 100 and second transceiver 102 also may be linked in a multipath environment. For example, a signal 104 transmitted by second transceiver 102 is radiated towards first transceiver 100 on the LoS path. First transceiver 100 and second transceiver 102 support both the transmission and the reception of electromagnetic waves. Use of the terms transmitter and receiver is to describe an example function that can be performed by each device. For purposes of discussion, second transceiver 102 is denoted as a transmitting transceiver, and first transceiver 100 is denoted as a receiving transceiver though each transceiver may be configured to support either or both functions. First transceiver 100 is illustrated as a base station of a communications system and second transceiver 102 is illustrated as a communications device that communicates with the base station such as a cell phone.

One or both of first transceiver 100 and second transceiver 102 may be mounted on moving objects such that a distance between the transceivers may change with time. As known to a person of skill in the art, the communication environment between first transceiver 100 and second transceiver 102 may fluctuate due to changes in environmental conditions such as weather, due to changes in interference sources, and due to movement between first transceiver 100 and second transceiver 102, which may change the multipath environment, any of which may cause a fluctuation in the received signal-to-noise ratio (SNR), signal-to-interference ratio (SIR), and/or signal to interference and noise ratio (SINR) even where the transmission power and other signal characteristics such as frequency, pulsewidth, bandwidth, etc. remain unchanged.

Figure 2:
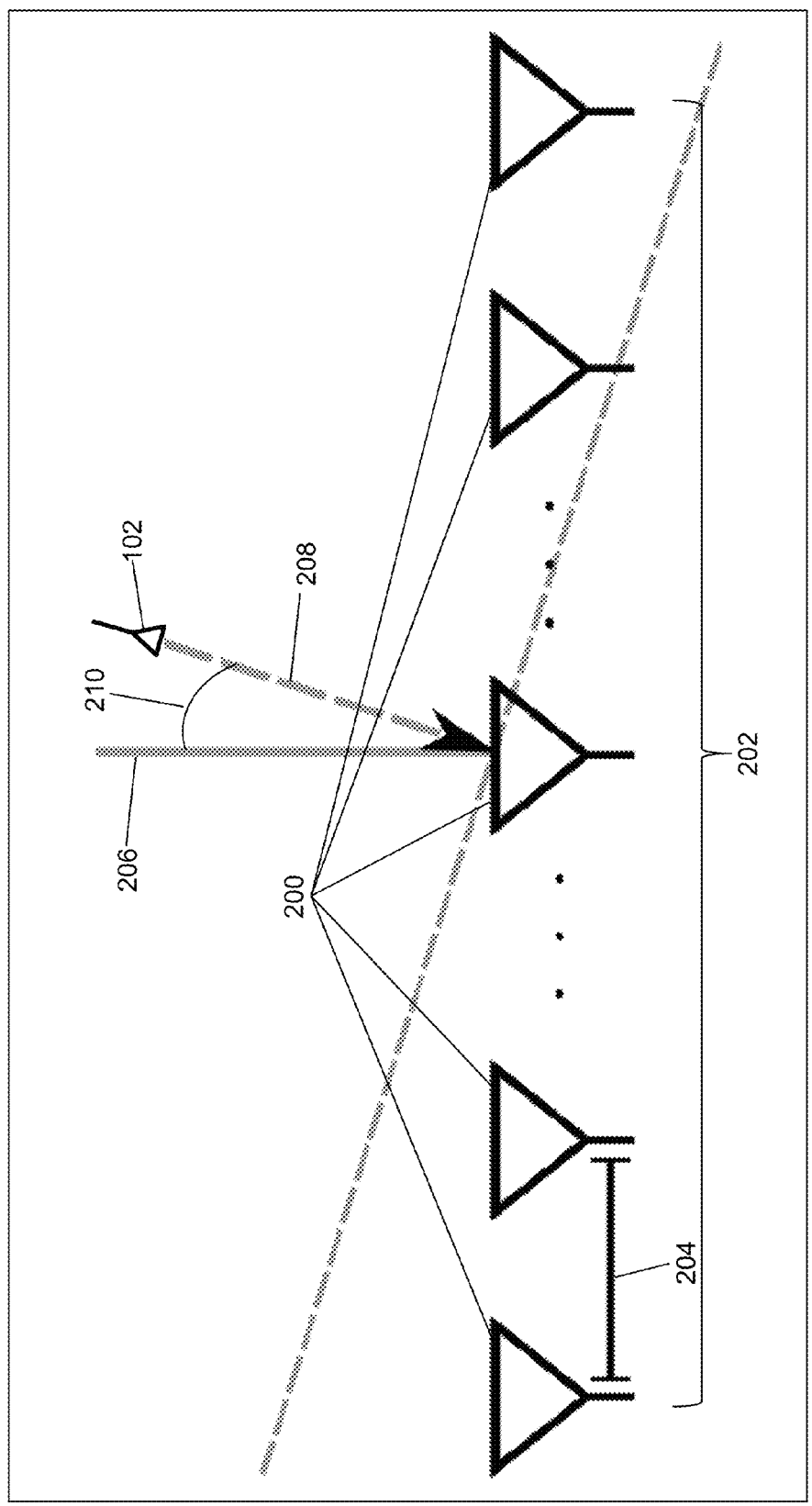
FIG. 2 depicts a transmitting transceiver and a receiver array of a receiving transceiver of the communication system of FIG. 1 in accordance with an illustrative embodiment.

Second transceiver 102 may include a single antenna or a plurality of antennas arranged to form an array. Referring to FIG. 2, first transceiver 100 may include a plurality of antennas 200 arranged to form an array 202. For illustration, array 202 may be a uniform or a non-uniform linear array, a rectangular array, a circular array, a conformal array, etc. The plurality of antennas 200 are mounted in a common plane. An antenna of the plurality of antennas 200 may be a dipole antenna, a monopole antenna, a helical antenna, a microstrip antenna, a patch antenna, a fractal antenna, a feed horn, a slot antenna, etc. An antenna spacing 204, which may be denoted d, may separate each of the plurality of antennas 200 from an adjacent antenna of the plurality of antennas 200 in the common plane. The plurality of antennas 200 are configured to receive an analog signal from second transceiver 102 and/or to radiate a plurality of radio waves toward second transceiver 102. The plurality of antennas 200 may include a number of antennas that may denoted as M.

A boresight vector 206 extends from a center of array 202 perpendicular to the common plane in which the plurality of antennas 200 is mounted. Second transceiver 102 is located along a direction vector 208 which defines an angle 210, which may be denoted $\phi_o$, relative to boresight vector 206. For illustration, $\phi_o$ represents only the azimuth angle relative to a linear array. Alternative embodiments can be extended to two-dimensional arrays in which the angle $\phi_o$ is replaced by a pair of angles representing the azimuth angle and the elevation angle.

Figure 3:
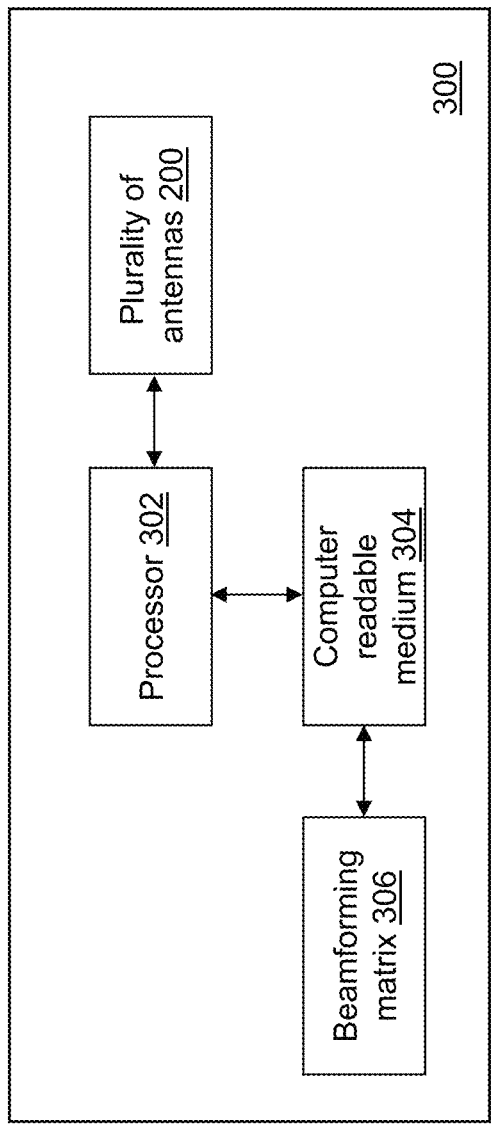
FIG. 3 depicts a block diagram of the receiving transceiver of FIG. 1 in accordance with an illustrative embodiment.

Referring to FIG. 3, a block diagram of a receiver 300 of first transceiver 100 is shown in accordance with an illustrative embodiment. Second transceiver 102 may include similar elements as understood by a person of skill in the art. Receiver 300 may include the plurality of antennas 200, a processor 302, a computer-readable medium 304, and a beamforming matrix 306. Different and additional components may be incorporated into receiver 300.

Processor 302 may form a signal that includes one or more information symbols that is sent to second transceiver 102. Processor 302 further may receive a received signal that includes one or more information symbols from the plurality of antennas 200. The received signal may be received by the plurality of antennas 200 after transmission by second transceiver 102. Processor 302 may implement a variety of well-known processing methods, collectively called space-time coding techniques, which can be used for encoding information into information symbols. Processor 302 further may perform one or more of converting a data stream from an analog to a digital form and vice versa, encoding the information symbols, decoding the information symbols, modulating the information symbols, demodulating the information symbols, up-converting the information symbols from a carrier frequency, that may be denoted $f_c$, down-converting the information symbols to the carrier frequency, performing error detection and/or data compression, Fourier transforming the information symbols, inverse Fourier transforming the information symbols, etc.

Processor 302 may be implemented as a special purpose computer, by logic circuits, by hardware circuits, in firmware, and/or using any combination of these methods. Processor 302 further may execute instructions meaning it performs/controls the operations called for by that instruction as understood by those skilled in the art. The term "execution" is the process of carrying out the operation called for by an instruction. The instructions may be written using one or more programming language, scripting language, assembly language, etc. Processor 302 operably couples with computer-readable medium 304. Processor 302 may retrieve a set of instructions from a permanent memory device and copy the instructions in an executable form to a temporary memory device that is generally some form of random access memory (RAM). Receiver 300 may include a plurality of processors that use the same or a different processing technology.

Computer-readable medium 304 is an electronic holding place or storage for information so the information can be accessed by processor 302 as understood by those skilled in the art. Computer-readable medium 304 can include, but is not limited to, any type of RAM, any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Receiver 300 may include one or more computer-readable media that use the same or a different memory media technology. For example, computer-readable medium 304 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency.

Figure 4:
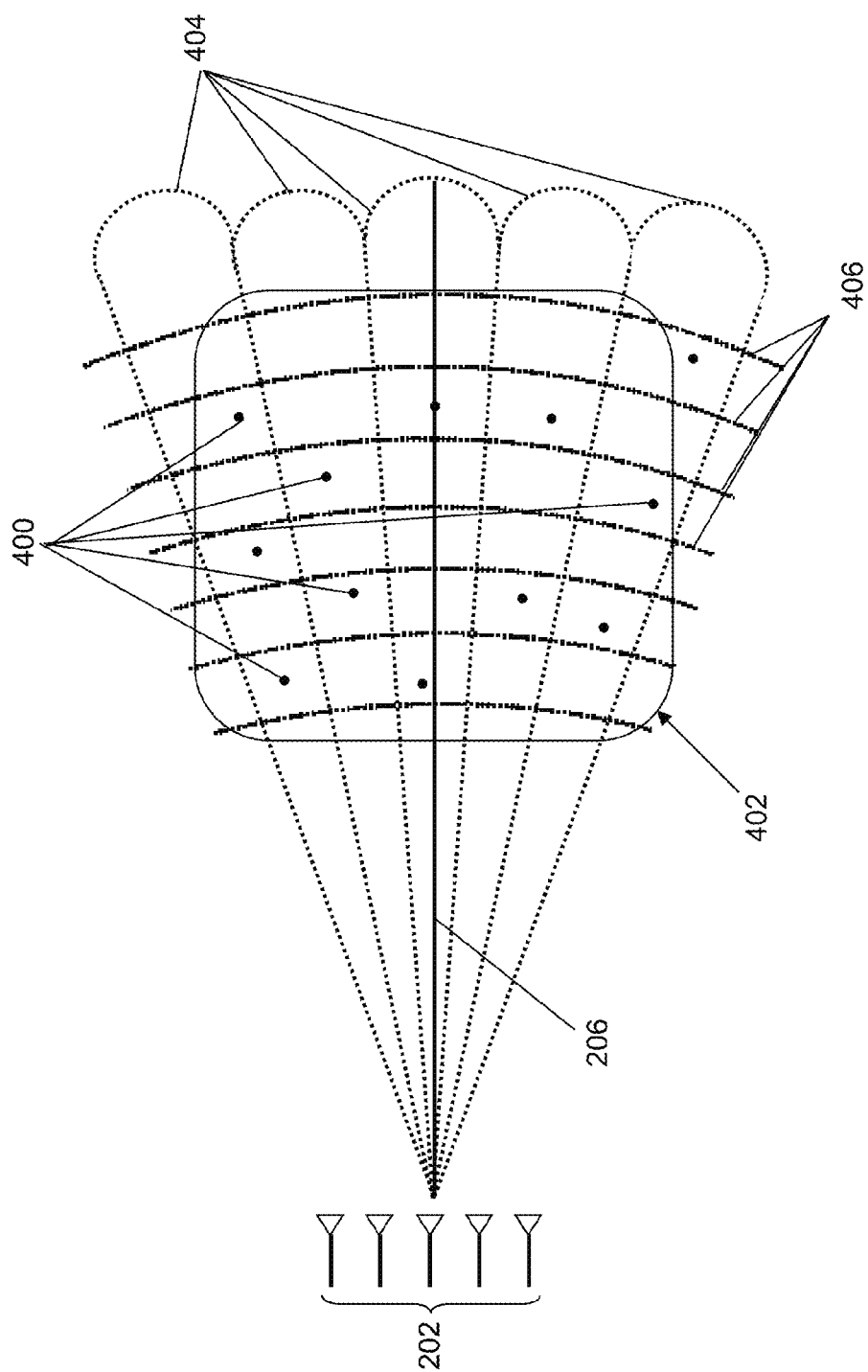
FIG. 4 depicts a beamspace of the receiving transceiver of FIG. 1 in accordance with an illustrative embodiment.

Referring to FIG. 4, first transceiver 100 may be configured to communicate with a plurality of second transceivers 400 that may be of the same or different types. For example, the plurality of second transceivers 400 may include various devices that transmit signals wirelessly using any type of standardized or proprietary communication protocol, frequency, bandwidth, etc. Example devices include computing devices of any form factor including smart phones, tablets, laptops, desktops, servers, etc., vehicles, sensing elements, etc.

The plurality of second transceivers 400 may be distributed over a region 402 randomly, uniformly, non-uniformly, etc. For example, cell phone devices may be distributed randomly throughout region 402. In the illustrative embodiment of FIG. 4, a non-uniform distribution of the plurality of second transceivers 400 is shown. Array 202 of first transceiver 100 is located sufficiently far from region 402 such that far-field assumptions apply. Region 402 can be spatially divided into M spatial beams 404 and a plurality of time delay rings 406 based on the spatio-temporal resolution supported by the plurality of antennas 200 of first transceiver 100. Region 402 may span azimuth angles of ±180 degrees and elevation angles of ±90 degrees.

For illustration, a single-input, multiple-output (SIMO) communication between second transceiver 102 comprised of a single antenna transmitter and first transceiver 100 comprised of an M-dimensional (M receive antennas) uniform linear array (ULA) receiver operating at a carrier frequency $f_c$ can be defined. As used herein, x is a vector; X is a matrix; $\underline{x}(t)$ is a vector valued function of time with Fourier transform $\underline{X}(f) = \mathcal{F}\{\underline{x}(t)\} = \int \underline{x}(t)e^{-j2\pi ft}dt$. A two-sided signal bandwidth for the SIMO communication can be defined as $$W = \alpha f_c, \alpha \in (0,2] \tag{1}$$

where α is a fractional bandwidth and is typically α<<1. The transmitter of second transceiver 102 may transmit a packet of duration T:

$$s(t) = \sum_{l=0}^{N-1} s_l \Psi_l(t) \tag{2}$$

where the $\{s_l\}_{l=0}^{N-1}$ are independent information symbols with energy $E[|s_l|^2] = \mathcal{E}_s$ and the $\{\psi_l(t)\}_{l=0}^{N-1}$ form an orthonormal basis for the N≈TW dimensional signal space.

In contrast with separable phased array based models, the M-dimensional complex baseband signal $\underline{r}(t)$ received at array 202 can be related to s(t) transmitted by second transceiver 102 by $$\underline{r}(t) = (\underline{h}*s)(t) + \underline{w}(t) = \sum_{l=0}^{N-1} s_l (\underline{h}*\Psi_l)(t) + \underline{w}(t) \tag{3}$$

where $\underline{h}(\tau)$ is an M×1 spatial channel impulse response and $\underline{w}(t)$ is a spatially and temporally white complex additive white Gaussian noise with power spectral density $N_o$. Taking the Fourier transform yields $$\underline{R}(f) = F\{\underline{r}(t)\} = \sum_{l=0}^{N-1} s_l \underline{H}(f)\Psi_l(f) + \underline{W}(f) \tag{4}$$

where $\underline{H}(f) = \{\mathcal{F}\{\underline{h}(\tau)\}$ is a spatial frequency response.

The beamspace channel representations in time and frequency are obtained by projecting the signal onto a set of orthonormal array steering vectors (M spatial beams 404) at first transceiver 100. A steering vector $a_M(\theta)$ is defined as $$a_M(\theta) = [e^{-j2\pi k\theta}]_{k \in I(M)} \tag{5}$$

where I(M)={l−(M−1)/2:l=0, . . . , M−1} is a symmetric set of indices centered around 0. Columns of beamforming matrix 306, $U_M$, are steering vectors that correspond to M fixed spatial angles, illustrated by M spatial beams 404, with uniform spacing Δθ=1/M.

$$U_M = \frac{1}{\sqrt{M}} [a_M(i\Delta\theta)]_{i \in I(M)} \tag{6}$$

and that represent M orthogonal beams (M spatial beams 404) forming a basis for the M-dimensional spatial signal space. Beamforming matrix 306, $U_M$, is a unitary discrete Fourier transform (DFT) matrix $U_M^H U_M = U_M U_M^H = I_M$. The beamspace system models in time and frequency are $$\underline{r}_b(t) = U_M^H \underline{r}(t) = \sum_{l=0}^{N-1} s_l(\underline{h}_b^* \Psi_l)(t) + \underline{w}_b(t) \tag{7}$$

$$\underline{R}_b(f) = U_M^H \underline{R}(f) = \sum_{l=0}^{N-1} s_l \underline{H}_b(f)\Psi_l(f) + \underline{W}_b(f) \tag{8}$$

where the beamspace channel impulse response and the beamspace channel frequency response are given by $$\underline{h}_b(\tau) = U_M^H \underline{h}(\tau), \underline{H}_b(f) = U_M^H \underline{H}(f). \tag{9}$$

The signal s(t) arrives at each antenna (array element) of array 202 with a slightly different delay. Assuming without loss of generality that the delay is 0 at the array center, the delay at the $k^{th}$ antenna of array 202 is $$\tau_k = k\delta\tau, k \in I(M); \delta\tau = \frac{d}{c}\sin(\varphi_o) \tag{10}$$

where δτ is the delay between adjacent antennas and c is the speed of light. Down mixing the signal s(t) from $f_c$, also manifests a delay as a phase shift between array antennas, $\theta_k = k\theta_o$, determined by a normalized spatial angle $$\theta_o = \delta\tau f_c = \frac{d}{\lambda_c}\sin(\varphi_o). \tag{11}$$

As understood by a person of skill in the art, $\lambda = c/f_c$.

In narrowband systems, the effects of the delay on s(t) can be ignored resulting in the baseband phased array model:

$$\underline{r}(t) = a_M(\theta_o)s(t) + \underline{w}(t). \tag{12}$$

However, as the array dimension and bandwidth increase, this is no longer true and the channel's spatial impulse response is $$\underline{h}(\tau) = [h_k(\tau)]_{k \in I(M)} \tag{13}$$

$$h_k(\tau) = e^{-j2\pi k\theta_o} W \operatorname{sinc}(W(\tau - k\delta\tau)) \tag{14}$$

where bandlimiting the spatial impulse response leads to the sincs. The $k^{th}$ antenna of the spatial frequency response is $$H_k(f) = \mathcal{F}\{h_k(\tau)\} = e^{-j\pi k(\delta\tau f + \theta_o)} \tag{15}$$

From equations (5), (11), and (15), the channel's spatial frequency response in the general case is $$\underline{H}(f) = a_M(\theta(f)), f \in [-W/2, W/2] \qquad (16)$$

with frequency dependent spatial angle $$\theta(f) = \theta_o\left(\frac{f}{f_c} + 1\right). \qquad (17)$$

The beamspace channel impulse response is $$\underline{h}_b(T) = U_M^H \underline{h}(T) = [h_{b,i}(T)]_{i \in I(M)} \qquad (18)$$

$$h_{b,i}(T) = \frac{1}{\sqrt{M}} a_M^H(i\Delta\theta)\underline{h}(T) =$$

$$\frac{1}{\sqrt{M}} \sum_{k \in I(M)} e^{-j2\pi k(\theta_O - i\Delta\theta)} W \mathrm{sinc}(W(T - k\sigma T)),$$

and the beamspace channel frequency response is $$H_b(f) = U_M^H H(f) = [H_{b,i}(f)]_{i \in I(M)} \qquad (19)$$

$$H_{b,i}(f) = \frac{1}{\sqrt{M}} a_M^H(i\Delta\theta)\underline{H}(f) = \frac{1}{\sqrt{M}} D_M(\theta(f) - i\Delta\theta).$$

Here $$D_M(\theta) = \frac{\sin(\pi M \theta)}{\sin(\pi \theta)}$$

is the Dirichlet sinc function with $D_M(0) = M$ and $D_M(m\Delta\theta) = 0$ for integers $m \neq 0$.

While the baseband phased array model from equation (12) shows no dispersion in spatial angle or time, equations (14) and (16) show dispersion in time across an aperture of the plurality of antennas 200 and dispersion in spatial angle across the bandwidth. Thus, a point source in narrowband systems spreads across spatial angle and time in wideband, high dimensional systems. Not accounting for the dispersion can lead to severe power loss and pulse distortion as shown below.

The magnitude of the channel dispersion can be determined by how many resolvable beams and delays the channel occupies. The angular spread of the channel over the bandwidth is $$\Delta\theta_{ch} = |\theta(W/2) - \theta(-W/2)| = \alpha|\theta_o| \qquad (20)$$

Dividing this by the orthogonal beam spacing $\Delta\theta = 1/M$ yields $$\Delta\theta_{ch}/\Delta\theta = M\alpha|\theta_o|, \qquad (21)$$

so the channel spans approximately $M\alpha|\theta_o|$ orthogonal beams. Similarly, the delay spread across the aperture is $$\Delta\tau_{ch} = M|\delta\tau|. \qquad (22)$$

Dividing this by delay resolution $\Delta\tau = 1/W$ yields $$\Delta\tau_{ch}/\Delta\tau = W\Delta\tau_{ch} = M\alpha|\theta_o|, \qquad (23)$$

so the channel spans approximately $M\alpha|\theta_o|$ resolvable delays. Thus, a channel dispersion factor $$\Delta_{ch} = M\alpha|\theta_o| = \Delta\tau_{ch}/\Delta\tau = \Delta\theta_{ch}/\Delta\theta \qquad (24)$$

captures the spreading of the channel in both angle and delay. For transmitters located at $\phi = 0$ (in the direction of boresight vector 206), from equation (11), $\theta_o = 0$ so $\Delta_{ch} = 0$ and no dispersion occurs. However, for any other angle, $\theta_o \neq 0$, dispersion occurs and increases as the bandwidth and array dimension increase.

The effects of $\Delta_{ch}$ can be illustrated by considering an energy spectral density of the channel impulse response:

$$S_{\underline{h}}(f) = \qquad (25)$$

$$\underline{H}^H(f)\underline{H}(f) = \underline{H}_b^H(f)H_b(f) = \sum_{i \in I(M)} |H_{b,i}(f)|^2 = \sum_{i \in I(M)} S_i(f) = M$$

where $S_i(f) = |H_{b,i}(f)|^2$ is an energy density captured by the $i^{th}$ beam. The channel power is $$\sigma^2 = \frac{1}{W} \int_{-\frac{W}{2}}^{\frac{W}{2}} S_{\underline{h}}(f) = \sum_{i \in I(M)} \sigma_i^2 = M \qquad (26)$$

where $\sigma_i^2$ is the power captured by the $i^{th}$ beam:

$$\sigma_i^2 = \frac{1}{W} \int_{-\frac{W}{2}}^{\frac{W}{2}} S_i(f) df. \qquad (27)$$

Because $S_{\underline{h}}(f)$ is constant with respect to frequency, if a receiver captures all of the channel power there is no pulse distortion. However, if a receiver does not capture all of the channel power, the energy spectral density captured by the receiver may not be flat and pulse distortion occurs. This can be seen by considering the case when $\theta_o = i_o\Delta\theta$ for some $i_o \in I(M)$. From equations (17) and (19), in this case, $$S_i(f) = \frac{1}{M} D_M^2\left(\theta_o \frac{f}{f_c} + (i_o - i)\Delta\theta\right) \qquad (28)$$

and from equation (24) the channel dispersion parameter is $\Delta_{ch} = \alpha i_o$. In particular, $$S_{i_o}(f) = |a_M^H(\theta_o)\underline{H}(f)|^2 = \frac{1}{M} D_M^2\left(\theta_o \frac{f}{f_c}\right)$$

is the power captured by a phased array receiver.

Figure 5A:
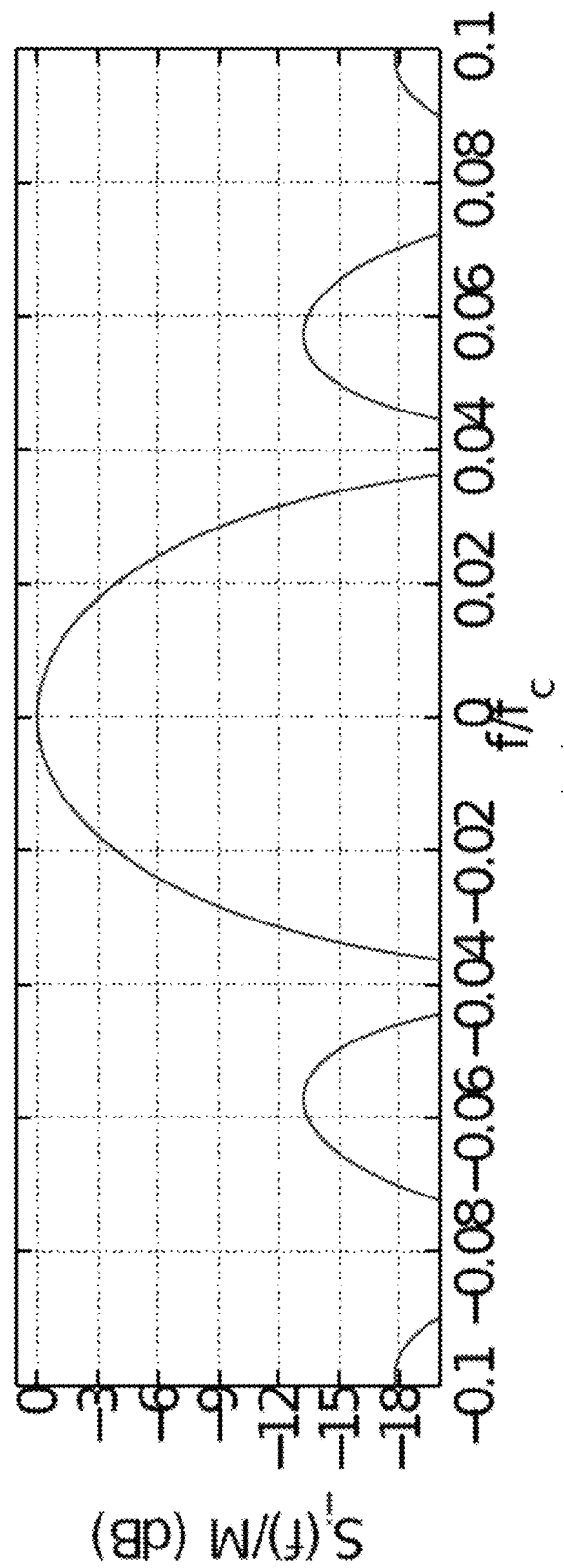
Figure 5D:
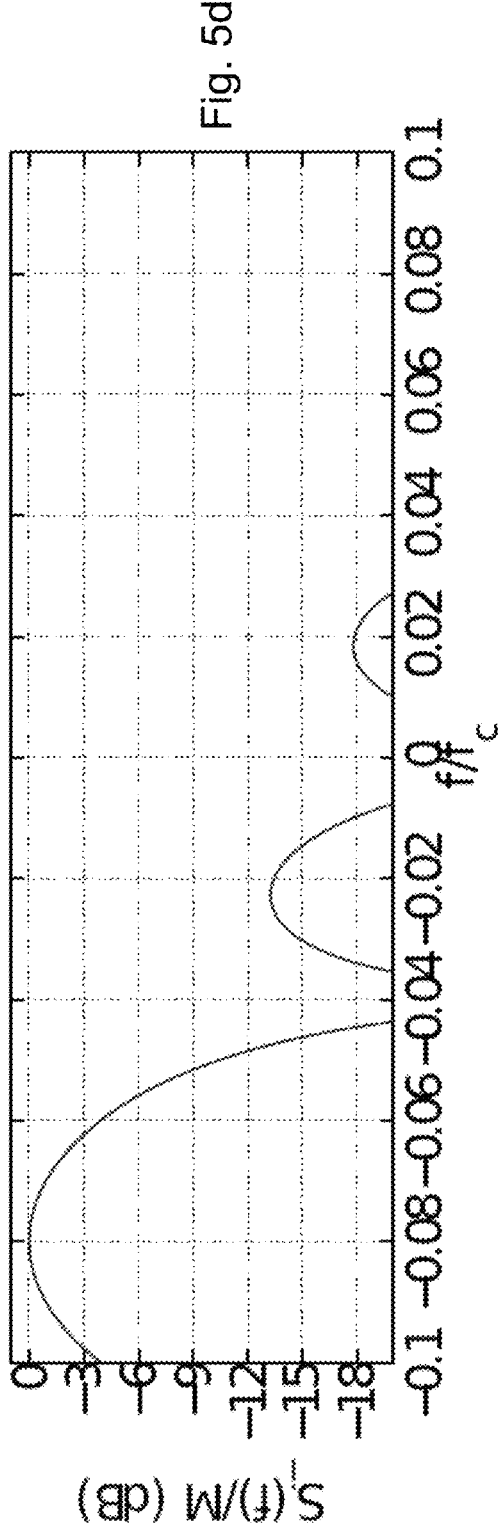
Figure 5E:
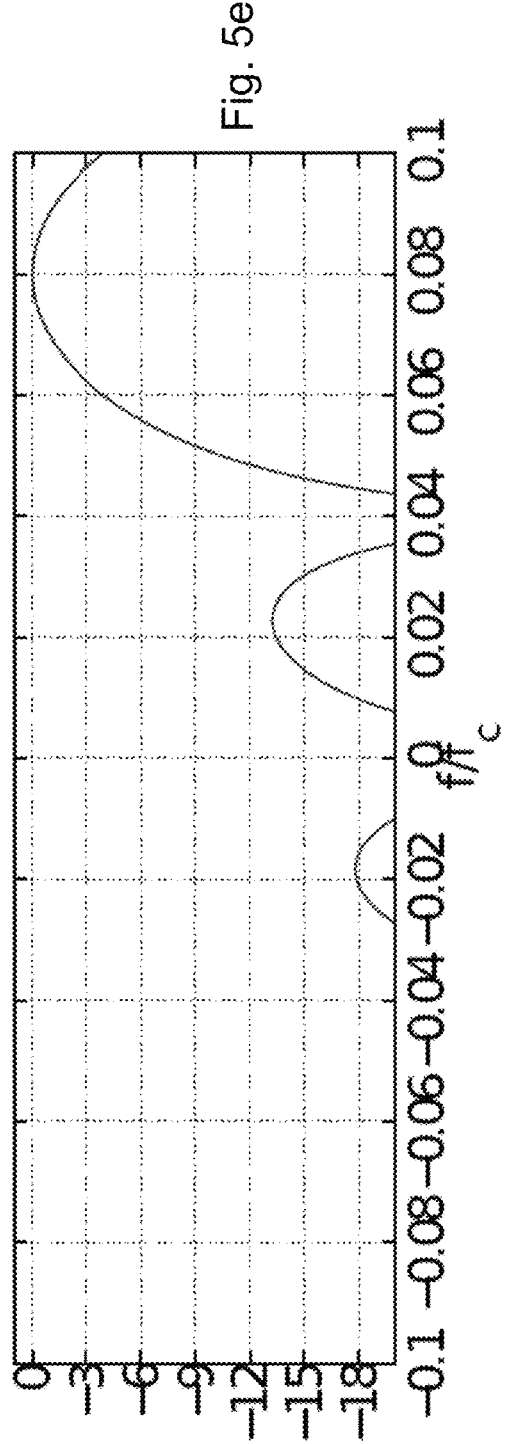

FIGS. 5a-5e show plots of $S_i(f)$ for an M=61 element array for $i_o = 25$ ($\phi_o = 55°$) as a function of normalized frequency for five values of i centered on $i_o$. FIG. 5a shows $S_i(f)$ for i=25; FIG. 5b shows $S_i(f)$ for i=24; FIG. 5c shows $S_i(f)$ for i=26; FIG. 5d shows $S_i(f)$ for i=23; and FIG. 5d shows $S_i(f)$ for i=27. When $\Delta_{ch} \ll 1$ ($|f/f_c| \ll 0.02$ over the bandwidth), $S_{i_o}(f) \approx M$ and $S_{i \neq i_o}(f) \approx 0$. So the $i_o^{th}$ beam has a flat energy density (over the bandwidth of interest), and a phased array receiver exhibits no power loss or pulse distortion as shown in FIG. 5a. Increasing $\Delta_{ch}$ causes variation in $S_{i_o}(f)$, in particular for $\Delta_{ch} = 2$ ($|f/f_c| \leq 0.04$ over the bandwidth), as shown in FIG. 5a, nulls begin to appear in $S_{i_o}(f)$. Thus, using a phased array receiver for larger values of $\Delta_{ch}$ results in severe power loss and pulse distortion. On the other hand, from FIGS. 5b-5e, it is clear that the power lost in $S_{i_o}(f)$ is present in the beams adjacent to the $i_o^{th}$ beam.

Figure 6A:
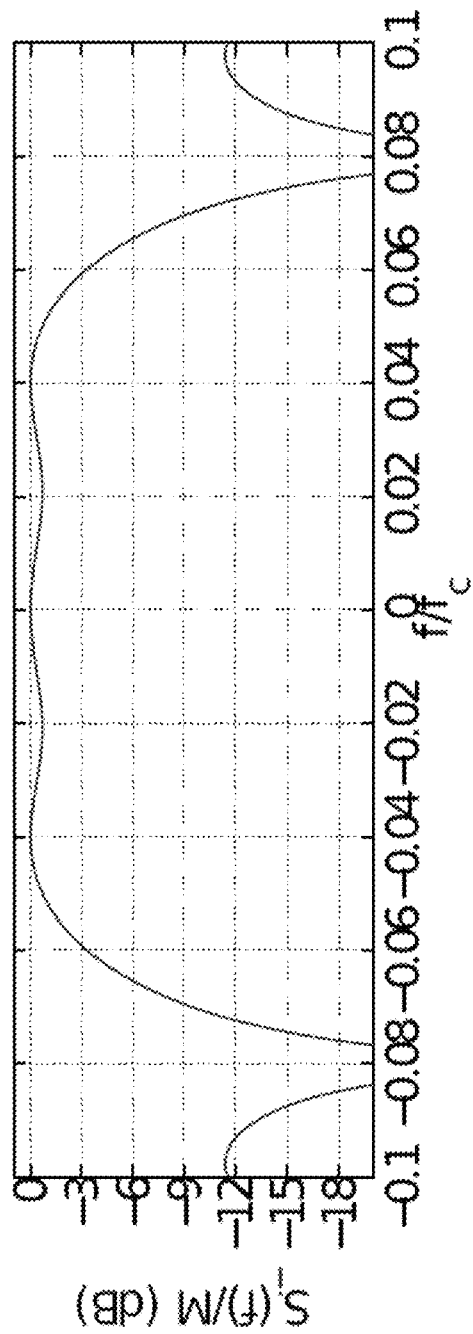
FIG. 6a shows a plot of $\Sigma_i\, S_i(f)$ for the M=61 element array for three beams centered at $i_o$, i={24, 25, 26}.
Figure 6B:
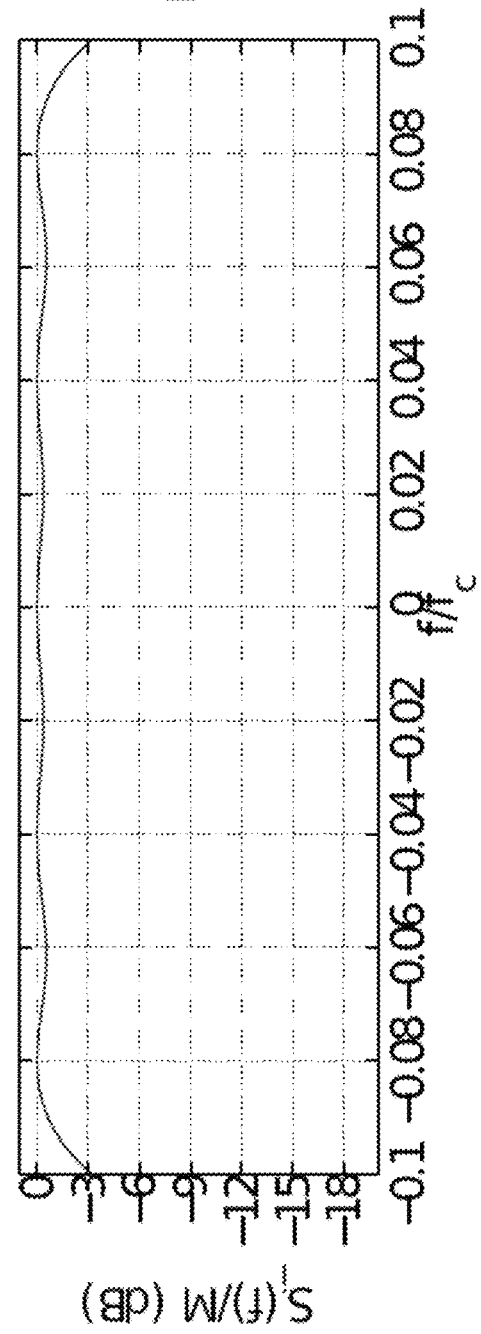
FIG. 6b shows a plot of $\Sigma_i\, S_i(f)$ for the M=61 element array for five beams centered at $i_o$, i={23, 24, 25, 26, 27}.

As shown in FIG. 6a, for $\Delta_{ch} \le (|f/f_c| \le 0.06$ over the bandwidth), combining the three beams centered on $i_o$ (FIG. 5a-5c) results in an approximately flat power density equal to M (see also equation (25)). Thus, a receiver that uses these three beams results in nearly no power loss or pulse distortion. If $\Delta_{ch}$ is increased to 5 ($|f/f_c| \le 0.1$ over the bandwidth), the three beams are no longer able to capture all the power, again resulting in pulse distortion and power loss. However, using all five beams shown in FIGS. 5a-5e results in an approximately flat power density as shown in FIG. 6b. In general, for a channel with channel dispersion factor $\Delta_{ch}$, a receiver using approximately $\Delta_{ch}$ beams centered at $i_o$ is able to capture approximately all the channel power and to introduce almost no pulse distortion.

The sufficient statistics $\{z_l\}_{l=0}^{N-1}$ for detecting the information symbols $\{s_l\}$ are obtained by taking an inner product of the received signal with waveforms $\{g_l(t)\}_{l=0}^{N-1}$ representing a mapping of $$\{\psi_\ell(t)\}_{\ell=0}^{N-1}$$

into the spatio-temporal receive signal space. The inner product is $$\langle \underline{x}, \underline{y} \rangle = \int \underline{y}^H(t)\underline{x}(t)dt = \int \underline{Y}^H(f)\underline{X}(f)df \quad (29)$$

with the associated norm $\|x\|^2 = \langle \underline{x}, \underline{x} \rangle$. This inner product may be calculated in either the spatial domain or beamspace, and in time or frequency. Thus, the $z_l$ are given by $$z_\ell = \langle \underline{r}, \underline{g}_\ell \rangle = \sum_{\ell'=0}^{N-1} s_{\ell'} \langle (\underline{h}^* \psi_{\ell'}), \underline{g}_\ell \rangle + \langle \underline{w}, \underline{g}_\ell \rangle = s_\ell A_\ell + \sum_{\ell' \ne \ell} s_{\ell'} B_{\ell,\ell'} + W_\ell. \quad (30)$$

where the signal amplitude and interference are $$A_l = \langle (\underline{h}^* \psi_l), \underline{g}_l \rangle, B_{l,l'} = \langle (\underline{h}^* \psi_{l'}), \underline{g}_l \rangle \quad (31)$$

and $W_l \sim CN(0, N_o \|g_l\|^2)$ represents the noise. For a given choice of basis functions $\{\psi_l(t)\}$, the SINR for the $l^{th}$ test statistic $(z_l)$ is $$SINR_\ell = \frac{\frac{E_s}{N_o}|A_\ell|^2}{\frac{E_s}{N_o}\sum_{\ell' \ne \ell}|B_{\ell,\ell'}|^2 + \|k_\ell\|^2}. \quad (32)$$

In the low SNR limit $$\frac{E_s}{N_o} \to 0$$

$$SINR_\ell \to SNR_\ell = \frac{E_s}{N_o}\frac{|A_\ell|^2}{\|k_\ell\|^2} \quad (33)$$

which represents the signal power captured by the receiver. Conversely in the high SNR limit $$\frac{E_s}{N_o} \to \infty$$

$$SINR_\ell \to SIR_\ell = \frac{|A_\ell|^2}{\sum_{\ell' \ne \ell}|B_{\ell,\ell'}|^2} \quad (34)$$

A natural choice for $g_l(t)$ is a matched filter $$\underline{g}_\ell(t) = \frac{1}{\sqrt{M}}(\underline{h}^* \psi_\ell)(t) \quad (35)$$

with norm $\|g_l\|^2 = 1$, which results in signal amplitude $$A_\ell = \frac{1}{\sqrt{M}} \int_{-\frac{W}{2}}^{\frac{W}{2}} \psi_\ell^*(f) a_M^H(\theta(f)) a_M(\theta(f)) \psi_\ell(f) df = \quad (36)$$

$$\sqrt{M} \int_{-\frac{W}{2}}^{\frac{W}{2}} |\psi_\ell(f)|^2 df = \sqrt{M}$$

and interference $$B_{\ell,\ell'} = \frac{1}{\sqrt{M}} \int_{-\frac{W}{2}}^{\frac{W}{2}} \psi_\ell^*(f) a_M^H(\theta(f)) a_M(\theta(f)) \psi_{\ell'}(f) df = \quad (37)$$

$$\sqrt{M} \int_{-\frac{W}{2}}^{\frac{W}{2}} \psi_\ell^*(f) \psi_{\ell'}(f) df = 0.$$

Thus, the matched filter introduces no interference regardless of the choice of basis functions, and the SINR is the SNR and is the same for all $z_l$ $$SINR_\ell = SNR_\ell = M\frac{E_s}{N_o}. \quad (38)$$

Plugging equation (35) into equation (30) yields $$z_l = \int g_l^H(t)\underline{r}(t)dt = \int \psi^*_l(\tau)[\int h^H(t-\tau)\underline{r}(t)dt]d\tau \quad (39)$$

so the optimal receiver can be interpreted as a bank of M adjustable delay filters and phase shifters defined by $h_k(\tau)$ followed by spatial combining and correlation with the basis functions, which corresponds to true time delay beamforming.

A phased array receiver corrects for the phase shift across array 202 in equation (14), but does not perform any temporal equalization to account for the delays, and as a result yields $$\underline{g}_l(t) = \frac{1}{\sqrt{M}} a_M(\theta_O) \Psi_l(t). \quad (40)$$

with norm $\|g_l\|^2 = 1$. This results in signal amplitude $$A_l = \frac{1}{\sqrt{M}} \int_{-\frac{W}{2}}^{\frac{W}{2}} \Psi_l^*(f) a_M(\theta_O) a_M(\theta(f)) \Psi_l(f) df = \quad (41)$$

$$\frac{1}{\sqrt{M}} \int_{-\frac{W}{2}}^{\frac{W}{2}} |\Psi_l(f)|^2 D_M\left(\theta_O \frac{f}{f_C}\right) df$$

and interference $$B_{l,l'} = \frac{1}{\sqrt{M}} \int_{-\frac{W}{2}}^{\frac{W}{2}} \Psi_l^*(f) a_M(\theta_O) \quad (42)$$

$$a_M\left(\theta(f) \Psi_{l'}(f) df = \frac{1}{\sqrt{M}} \int_{-\frac{W}{2}}^{\frac{W}{2}} \Psi_l^*(f) \Psi_{l'}(f) D_M\left(\theta_O \frac{f}{f_C}\right) df.$$

In contrast with the matched filter, the SINR of the phased array receiver depends on $\Delta_{ch}$ and the choice of basis functions. From FIGS. 5a-5e, it was shown that as $\Delta_{ch}$ increases, the value of $$D_M\left(\theta_o \frac{f}{fc}\right)$$

varies over the bandwidth. From equation (41), this variation results in power loss, and from equation (42), results in interference between the basis functions.

The implementation of the phased array receiver corresponds to removing the filter bank used for space-time equalization in the optimal receiver. In the special case when $\theta_o = i_o \Delta\theta$, this also corresponds to correlating the $i_o^{th}$ element of the beamspace received signal, $r_{b,i_o}(t)$, with the basis functions $\{\psi_l(t)\}$.

The optimal matched filter receiver indicated by equation (35) in beamspace is $$g_{b,l}(t) = \frac{1}{\sqrt{M}} (\underline{h}_b^* \Psi_l)(t) \qquad (43)$$

where the space-time equalization is performed over all M beams. However, as discussed previously, the majority of the channel power is captured by approximately $\Delta_{ch}$ beams. Thus, a low-complexity receiver can be designed by processing only these dominant beams. A set $\mathcal{M} \subseteq I(M)$ of dominant beams can be defined as $$\mathcal{M} = \{i \in I(M) : \sigma_i^2 \geq \gamma\} \qquad (44)$$

where $\sigma_i^2$ is a channel power captured by the $i^{th}$ beam from equation (27). A threshold $\gamma$ is pre-defined and may be defined so that the number of dominant beams are at least equal to the channel spread factor, that is $p = |\mathcal{M}| \approx \Delta_{ch}$, and also capture the majority of the channel power to result in an approximately flat energy density.

Selection of the dominant beams using the threshold and equation (44) is useful in the general case of line-of-sight and/or multipath propagation because it selects all dominant beams up to the point of recovering a desired (and sufficiently large) fraction of the channel power (e.g., 95% of channel power is included so $\gamma$ is set to capture at least 95% of the total channel power) (setting $\gamma$ to 95% of the total channel power may result in at most one and possibly no beams being selected. For example, if p=3 as in FIG. 5a-c, each beam captures about 33% of the channel power so no beams may be selected) so that the resulting energy spectral density is nearly flat (and thus, intersymbol interference is minimized) as illustrated in FIGS. 6a and 6b. In essence, each propagation path is mapped to multiple beams (approximately equal to the channel spread factor). Since the channel spread factor is known a priori based on the beam direction, the channel spread factor can also help determine the number of beams associated with each propagation path without using the explicit thresholding of equation (44). In general, due to energy leakage when a fixed beam does not exactly line up with a path direction, the selected number of beams associated with each path is a small multiple, such as 2 to 4, of the channel spread factor.

Figure 7:
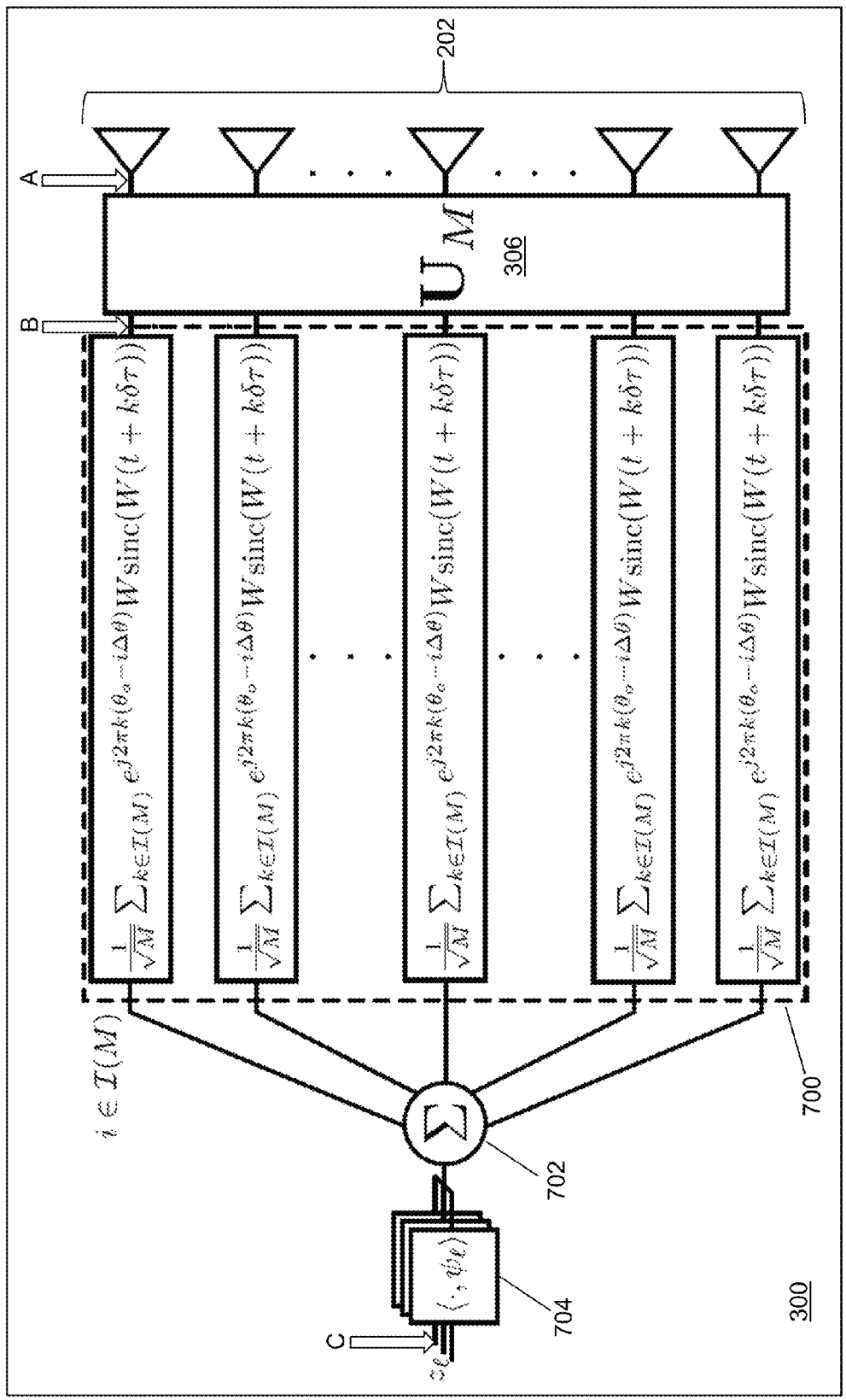
FIG. 7 shows an optimal receiver implementation of the receiving transceiver in accordance with an illustrative embodiment.

An optimal receiver's beamspace implementation is shown in FIG. 7. The complex baseband signal $\underline{r}(t)$ is received at array 202. The complex baseband signal is transformed to the beamspace system model by applying beamforming matrix 306, $U_M$, as indicated by equation (7) in the time domain or by equation (8) in the frequency domain. A bank of M filters 700 defined by $\underline{h}_{b,i}(\tau)$ is applied to the signal after the beamspace transformation ($U_M$). The filtered beams may be combined by an additive mixer 702 as understood by a person of skill in the art. The combined beams may be correlated with the chosen basis functions using a correlator 704 to determine the $l^{th}$ test statistic ($z_l$) as understood by a person of skill in the art. The information symbols $\{s_l\}$ transmitted by second transceiver 102 can be detected using the l test statistics ($z_l$), depending on the digital constellation used at the transmitter, as understood by a person of skill in the art. Application of beamforming matrix 306, $U_M$, the bank of M filters 700, additive mixer 702, and correlator 704 to the received complex baseband signal $\underline{r}(t)$ may be performed by processor 302 of receiver 300.

The bank of M filters 700 include a spatial phase shift component and a temporal delay component. For example, the spatial phase shift component may be computed as $e^{j2\pi k(\theta_o - i\Delta\theta)}$. For example, the temporal delay component may be computed as $$\tau_k = k\delta\tau = \frac{k\theta_O}{fc}.$$

As shown in rig. 7, each filter of the bank of M filters 700 may be defined as $$\frac{1}{\sqrt{M}} \sum_{k \in I(M)} e^{j2\pi k(\theta_O - i\Delta\theta)} W \mathrm{sinc}(W(t + \tau_k)).$$

Figure 8:
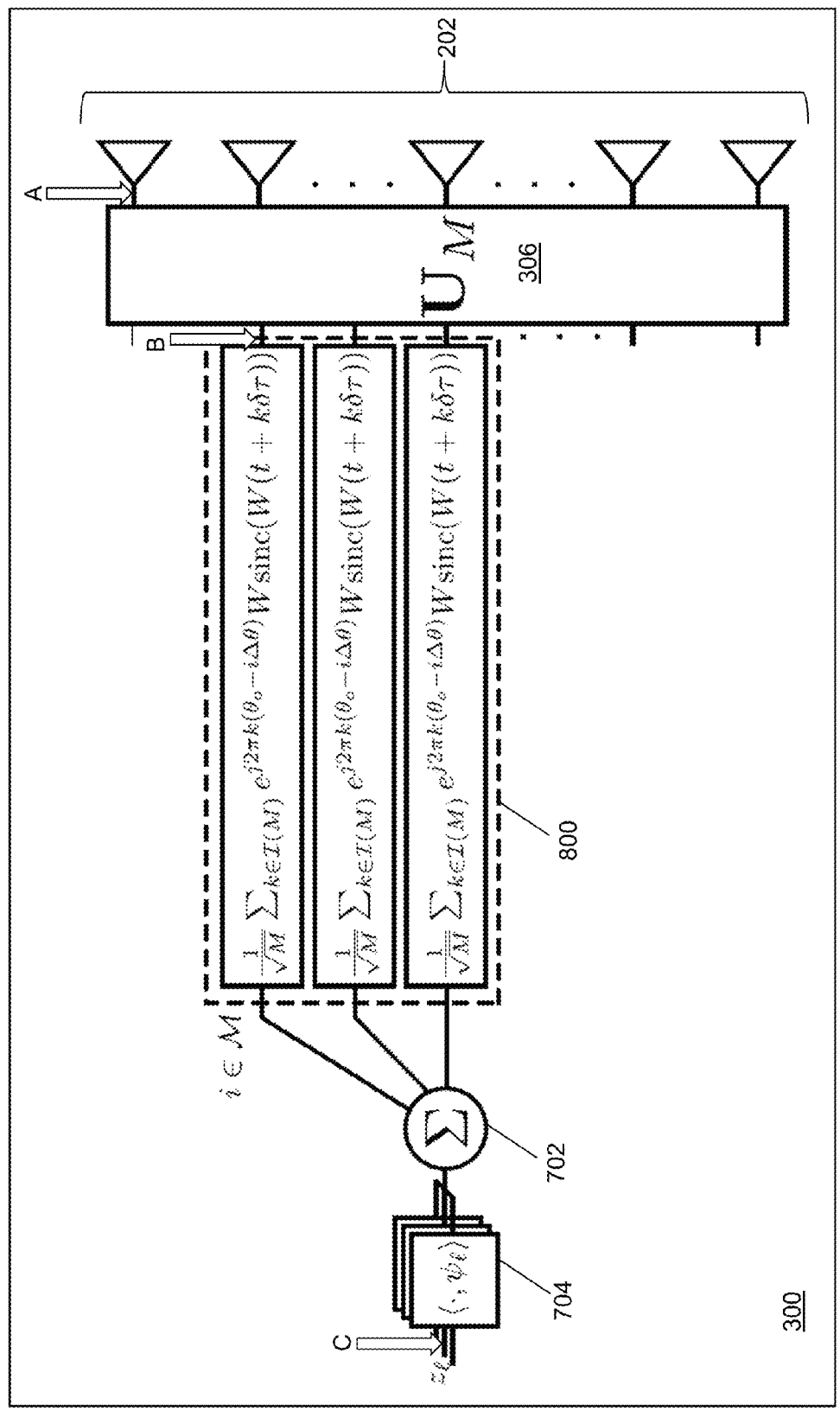
FIG. 8 shows a near optimal, low-complexity receiver implementation of the receiving transceiver in accordance with an illustrative embodiment.

A near-optimal receiver represented in FIG. 8 can be defined by $$g_{b,l,i}(t) = \begin{cases} \frac{1}{\sqrt{M}}(h_{b,i}^* \Psi_l)(t) & i \in \mathcal{M} \\ 0 & i \notin \mathcal{M} \end{cases} \qquad (45)$$

with norm $$\|g_{b,l}\|^2 = \frac{1}{M^2} \int |\Psi_l(f)|^2 \left(\sum_{i \in \mathcal{M}} D_M^2(\theta(f) - i\Delta\theta)\right) df,$$

which results in the following signal amplitude and interference expressions $$A_l = \frac{1}{\sqrt{M}} \int \Psi_l^*(f) \left(\sum_{i \in \mathcal{M}} |H_{b,i}(f)|^2\right) \Psi_l(f) df = \qquad (46)$$

$$\frac{1}{M^{\frac{3}{2}}} \int_{-\frac{W}{2}}^{\frac{W}{2}} |\Psi_l(f)|^2 \left(\sum_{i \in \mathcal{M}} D_M^2(\theta(f) - i\Delta\theta)\right) df$$

-continued $$B_{l,l'} = \frac{1}{M^{\frac{3}{2}}} \int_{-\frac{W}{2}}^{\frac{W}{2}} \Psi_l^*(f) \left( \sum_{i \in \mathcal{M}} D_M^2(\theta(f) - i\Delta\theta) \right) \Psi_{l'}(f) df. \quad (47)$$

When $$p \approx \Delta_{ch'} \sum_{i \in \mathcal{M}} \frac{1}{M} D_M^2(\theta(f) - i\Delta\theta) \approx M$$

over the bandwidth, $A_l \approx \sqrt{M}$ and $B_l \approx 0$. So, in contrast to the phased array receiver, by combining beamforming and space-time equalization, the low-complexity receiver is able to attain near-optimum performance.

As summarized in FIG. 8, the complex baseband signal $\underline{r}(t)$ is received at array 202. The complex baseband signal is transformed to the beamspace system model by applying beamforming matrix 306, $U_M$, as indicated by equation (7) in the time domain or by equation (8) in the frequency domain. The beams p in $\mathcal{M}$ are selected using equation (44) and the pre-defined threshold $\gamma$. A bank of filters 800 are defined according to equation (45) based on the selected beams p, $i \in \mathcal{M}$. The filtered beams (based on the channel responses $h_{b,i}(t)$ as in equation (18)) may be combined by additive mixer 702. The combined beams may be correlated with the chosen basis functions using correlator 704 to determine the $l^{th}$ test statistic $(z_l)$ as understood by a person of skill in the art. The information symbols $\{s_l\}$ transmitted by second transceiver 102 can be detected using the l test statistics $(z_l)$, depending on the digital constellation used at the transmitter. Application of beamforming matrix 306, $U_M$, the bank of filters 800, additive mixer 702, and correlator 704 to the received complex baseband signal $\underline{r}(t)$ may be performed by processor 302 of receiver 300. The low-complexity near-optimal implementation differs by only performing the filtering and combining over the p beams in $\mathcal{M}$ as shown in FIG. 8. Because $p \approx \Delta_{ch}$, this corresponds to a complexity reduction by a factor of approximately $\alpha\theta_o$.

Additional functions of a receiver 300 may include downmixing and analog-to-digital (A/D) conversion. As understood by a person of skill in the art, downmixing and A/D conversion may be implemented at different points in the signal processing as illustrated in FIGS. 7 and 8. For example, in an all digital receiver implementation (beamforming matrix 306, the bank of M filters 700 or the bank of filters 800, additive mixer 702, and correlator 704 implemented digitally), downmixing and A/D conversion may be implemented at point "A" indicated in FIGS. 7 and 8, after receipt of the signal by the plurality of antennas 200 of array 202 and before further processing by beamforming matrix 306.

As another example, in a digital receiver with an analog beamforming implementation (beamforming matrix 306 implemented in analog passband, for example, by a lens, and the bank of M filters 700 or the bank of filters 800, additive mixer 702, and correlator 704 implemented digitally), downmixing and A/D conversion may be implemented at point "B" indicated in FIGS. 7 and 8, after processing by beamforming matrix 306 and before further processing by the bank of M filters 700.

As yet another example, in an analog receiver (beamforming matrix 306, the bank of M filters 700 or the bank of filters 800, additive mixer 702, and correlator 704 implemented in analog passband), downmixing and A/D conversion may be implemented at point "C" indicated in FIGS. 7 and 8, after processing by correlator 704 and before any further signal processing.

For illustration, receiver performance can be compared for a sinc pulse single carrier communication system where the N basis functions are delayed versions of the sinc pulse of bandwidth W:

$$\Psi_l(t) = \frac{1}{\sqrt{W}} \mathrm{sinc}\left(W\left(t - \frac{l}{W}\right)\right), \Psi_l(f) = e^{-j2\pi \frac{l}{W} f}. \quad (48)$$

Since $|\psi_l(f)|^2 = 1$, the signal power $|A_l|^2$ is constant. Similarly, since $$\Psi_l^*(f)\Psi_{l'}(f) = e^{j2\pi \frac{l-l'}{W}},$$

from equations (42) and (47), the interference terms $B_{l,l'}$ are completely determined by $m=l-l'$ with $B_m = B^*_{-m}$. Thus, the interference power is symmetric $|B_m|^2 = |B_{-m}|^2$. Results were calculated for an M=61 element, $$\frac{\lambda_c}{2}$$

spaced array (6 inch array at 60 gigahertz) receiving a signal from $\phi=55°$ ($\theta_o=25\Delta\theta$). The signal amplitude and interference terms were calculated through numerical integration for the central $l=\lceil N/2 \rceil^{th}$ pulse. For the largest a considered, for all receivers, the $|B_M|^2$ values drop below −40 dB of the maximum when $|m| \geq 8$. Thus, interference for $|m| \geq 8$ can be ignored and the results provide a good assessment of the SINR of any pulse for N>16, except for edge cases (e.g. l=0) where interference will be at most 3 dB lower due to symmetry of the $|B_M|^2$.

Figure 9A:
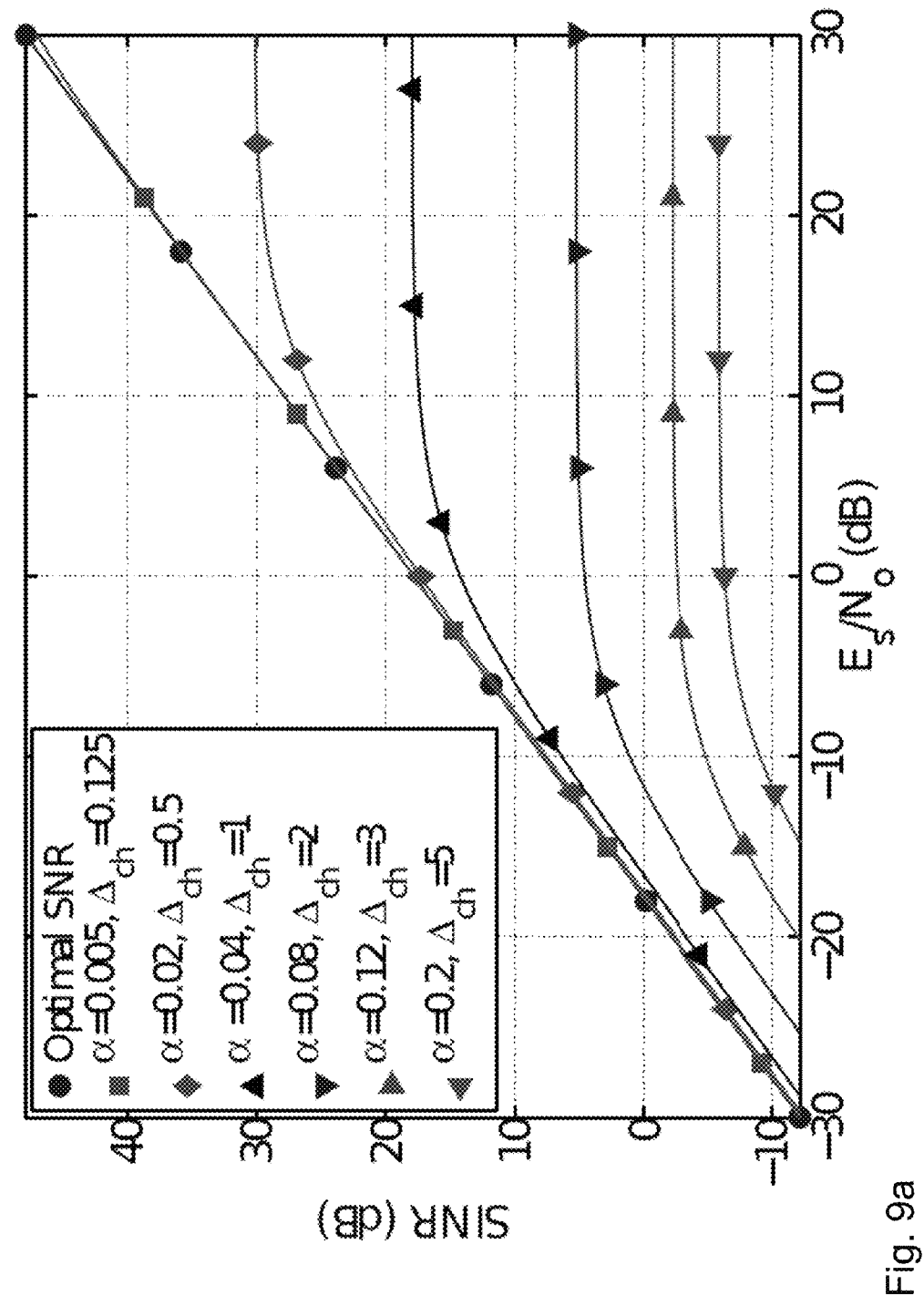
FIG. 9a presents signal to interference and noise ratio (SINR) curves as a function of signal to noise ratio (SNR) for a phased array receiver with different values for a channel dispersion factor in accordance with an illustrative embodiment.

When considering the results, from equation (33) the SINR values at low $$\frac{E_s}{N_o}$$

represent me power loss and from equation (34) the SINR values at high $$\frac{E_s}{N_o}$$

represent the interference caused by pulse distortion. FIG. 9a plots the SINR for the phased array receiver for several values of $\alpha(\Delta_{ch})$, which as expected exhibits severe performance losses as a increases. Even at the relatively low value of $\alpha=0.02$ ($\Delta_{ch}=0.5$) where there is essentially no power loss, interference causes a 15 dB loss of SINR compared to an optimum value at $$\frac{E_s}{N_o}$$

of 30 dB. Further increasing $\alpha$ only causes more interference, and once $\alpha \geq 0.08$ ($\Delta_{ch} \geq 2$) significant power loss occurs since $D_M(\theta_o f/f_c)$ includes nulls in the bandwidth (see FIGS. 5a-e) resulting in severe power loss.

Figure 9B:
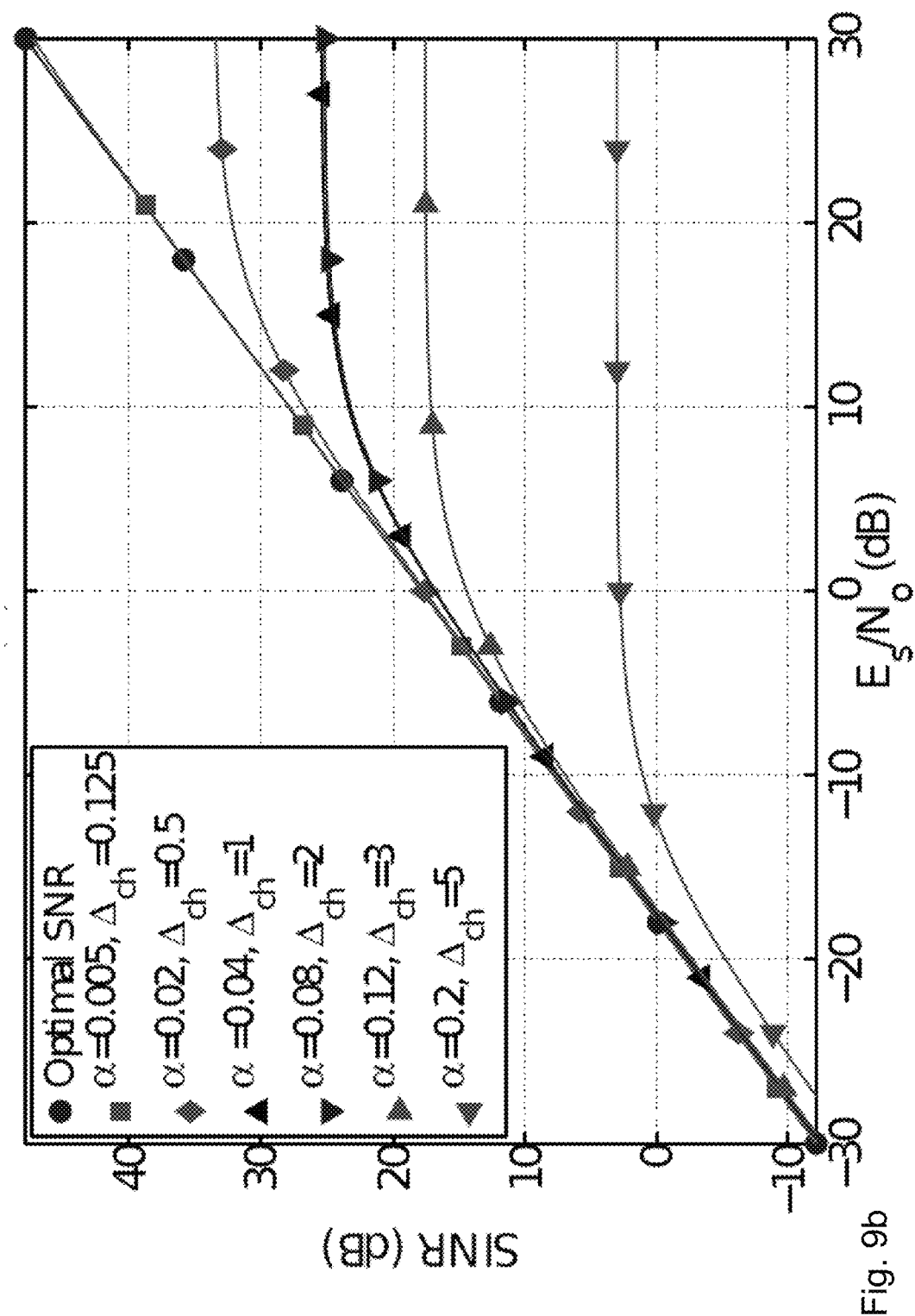
FIG. 9b presents SINR curves as a function of SNR for a three-beam receiver with the different values for the channel dispersion factor in accordance with an illustrative embodiment.
Figure 9C:
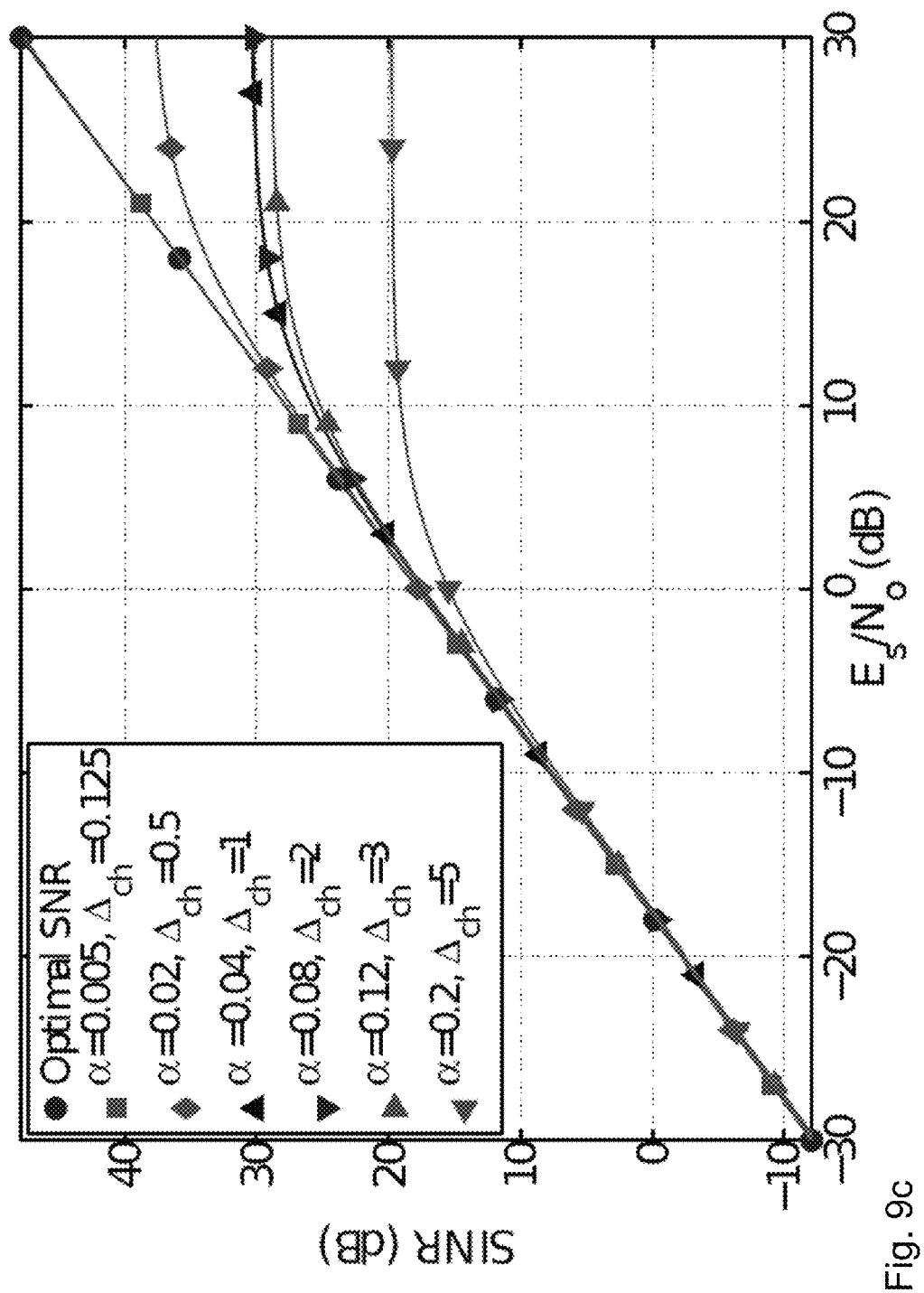
FIG. 9c presents SINR curves as a function of SNR for a five-beam receiver with the different values for the channel dispersion factor in accordance with an illustrative embodiment.

The low-complexity receiver depicted in FIG. 8 showed much less interference and power loss as shown in FIG. 9b for a 3-beam receiver (p=3) and in FIG. 9c for a 5-beam receiver (p=5). While there is still interference, it was significantly reduced as compared to the phased array receiver. Furthermore, when p≥$\Delta_{ch}$, essentially no power loss occurred. FIGS. 9b and 9c also illustrate the ability of the low-complexity receiver depicted in FIG. 8 to deliver near-optimum performance by including a sufficiently large number of beams—at least $\Delta_{ch}$. Thus, the low-complexity near-optimal implementation shown in FIG. 8, delivers near-optimum performance with dramatically reduced complexity. The 5-beam receiver outperformed the 3-beam receiver in terms of interference even when $\Delta_{ch}$≤3.

For an OFDM system with N subcarriers the basis functions are $$\Psi_l(t) = \frac{1}{\sqrt{T}} e^{j2\pi f_l t}, 0 \le t \le T. \tag{49}$$

where T=NW and the subcarrier center frequencies are $$f_l = (l - \lfloor N/2 \rfloor) 1/T. \tag{50}$$

The Fourier transforms of the $\psi_l(t)$ are $$\psi_l(f) = \sqrt{T} e^{-\pi T(f-f_l)} \mathrm{sinc}(T(f-f_l)). \tag{51}$$

With the approximation $\sqrt{T}\mathrm{sinc}(T(f-f_l)) \to \delta(f-f_l)$ as T→∞ and from the interference expressions for the phased array and near optimal beamspace receivers, in both cases $B_{l,l} \approx 0$. Thus, for both receivers, the use of OFDM eliminates intersymbol interference. However, the signal amplitudes show a significant difference. From equation (41), the signal amplitude for the phased array receiver is $$A_l \approx \frac{1}{\sqrt{M}} D_M\left(\theta_O \frac{f_l}{f_c}\right).$$

$D_M(\theta_o f/f_c)$ occupies approximately $1/\Delta_{ch}$ of the available bandwidth. So only approximately $1/\Delta_{ch}$ of the OFDM subcarriers have a sufficiently high SNR to support communication.

On the other hand, the amplitude for the near optimal B-MIMO receiver is $$A_l \approx \frac{1}{M^{\frac{3}{2}}} \sum_{i \in \mathcal{M}} D_M^2(\theta(f_l) - i\Delta\theta).$$

When p=|$\mathcal{M}$|≈$\Delta_{ch}$, $$\sum_{i \in \mathcal{M}} D_M^2(\theta(f_l) - i\Delta\theta) \approx M^2.$$

So the near optimal B-MIMO receiver signal amplitude is approximately constant across the subcarriers with $A_l \approx \sqrt{M}$. Thus, in contrast with the phased array receiver, if p≈$\Delta_{ch}$ the B-MIMO receiver has a sufficiently high SNR for communication for all the OFDM subcarriers and is able to fully exploit the available bandwidth.

In a system with transmit basis waveforms of the form $$\Psi_l(t) = \sum_{n=0}^{N-1} \Psi_{l,n} u(t - nT_s) \tag{52}$$

where $T_s$ is the symbol period, $$W_s = \frac{1}{T_s}$$

is the signaling bandwidth, N≈$W_s T$, $\psi_l = [\psi_{l,0} \ldots \psi_{l,N-1}]^T$, and the $\{\psi_l\}_{l=0}^{N-1}$ are the digital basis waveforms with $$\langle \psi_l, \psi_{l'} \rangle = \psi_l^H \psi_{l'} = \delta_{l,l'}. \tag{53}$$

The pulse u(t) with Fourier transform U(f)=$\mathcal{F}\{u(t)\}$ represents the pulse shaping filter with bandwidth W≥$W_s$ applied to the output of the digital-to-analog converter (DAC) that converts the digitial waveforms to analog waveforms. The inner product of the basis waveforms is $$\langle \Psi_l, \Psi_{l'} \rangle = \tag{54}$$

$$\int_0^T \Psi_l^*(t) \Psi_{l'}(t) dt = \sum_{n=0}^{N-1} \sum_{n'=0}^{N-1} \Psi_{l,n}^* \Psi_{l',n'} \int_0^T u^*(t-nT_s) u(t-n'T_s) dt$$

$$= \sum_{n=0}^{N-1} \sum_{n'=0}^{N-1} \Psi_{l,n}^* \Psi_{l',n'} \int_{-\frac{W}{2}}^{\frac{W}{2}} |U(f)|^2 e^{-j2\pi \frac{n'-n}{W_s}} df \tag{55}$$

If the pulse u(t) is chosen to be the root raised cosine filter with bandwidth W=(1+β)$W_s$ it can be shown that $$\int_{-\frac{W}{2}}^{\frac{W}{2}} |U(f)|^2 e^{-j2\pi \frac{n'-n}{W_s}} df = \delta_{n,n'} \tag{56}$$

and the basis waveforms are orthonormal. Plugging equation (52) into the expression for the matched filter equation (35) yields $$g_l(t) = \frac{1}{\sqrt{M}} (h^* \Psi_l)(t) = \frac{1}{\sqrt{M}} \int_0^T \Psi_l(\tau) h(t-\tau) d\tau = \tag{57}$$

$$\frac{1}{\sqrt{M}} \sum_{n=0}^{N-1} \Psi_{l,n} \int_0^T u(\tau - nT_s) h(t-\tau) d\tau.$$

From equation (16), the $k^{th}$ element of the integral in (57) can be written as $$\int_0^T u(\tau - nT_s) e^{-j2\pi k\theta} \circ W \mathrm{sinc}(W(t-\tau-k\delta T)) d\tau = \tag{58}$$

$$e^{-j2\pi k\theta} \circ u(t - k\delta T - nT_s).$$

Thus, if the basis waveforms are chosen according to (52) the receiver implementation consists of replacing the sinc filters shown in FIGS. 7 and 8 with u(t), sampling the output of the combiner at $t=\{nT_s\}_{n=0}^{N-1}$, and performing the inner products in the digital domain with the $\{\psi_l\}_{l=0}^{N-1}$.

Given a multiple-input, single-output (MISO) system with an $M_T$-element ULA transmitter communicating with a single-antenna receiver located at $\phi_{T,o} \leftrightarrow \theta_{T,o}$, the LoS wideband MISO system model (baseband frequency domain) is $$R(f)=\underline{H}^H(f)\underline{X}(f)+W(f); \underline{H}(f)=a_{M_T}(\theta_T(f)) \quad (59)$$

where R(f) is the received signal, $\underline{X}$(f) is the transmitted signal vector, W(f) is noise, and the frequency-dependent beam angle $\theta_T$(f) is related to $\theta_{T,o}$ as in equation (17). The beamspace LoS wideband MISO system model is $$R(f) = H_b^H(f)X_b(f) + W(f); H_b(f) = [H_{b,i}(f)]_{i \in I(M)}, \quad (60)$$

$$H_{b,i}(f) = \frac{1}{\sqrt{M}} D_M(\theta_T(f) - i\Delta\theta_T)$$

where $\underline{X}_b$(f) is the beamspace transmitted signal vector and $\Delta\theta_T=1/M_T$ is the transmit orthogonal beam spacing.

For MIMO communication between an $M_T$ dimensional ULA transmitter and an $M_R$ dimensional ULA receiver, the wideband MIMO system model is $$\underline{R}(f)=H(f)\underline{X}(f)+\underline{W}(f) \quad (61)$$

where $\underline{R}$(f) is the received signal vector, $\underline{X}$(f) is the transmitted signal vector, H(f) is the $M_R \times M_T$ spatial channel frequency response, and W(f) is noise. The beamspace wideband MIMO model is $$\underline{R}_b(f)=H_b(f)\underline{X}_b(f)+\underline{W}_b(f) \quad (62)$$

where $\underline{R}_b$(f) is the beamspace received signal vector, $\underline{X}_b$(f) is the beamspace transmitted signal vector, $H_b(f)=U_{M_R}^H H(f)U_{M_T}$ is the $M_R \times M_T$ spatial channel frequency response, and $\underline{W}_b$(f) is beamspace noise. The antenna domain and beamspace LoS wideband MIMO channel models readily follow from the SIMO and MISO models:

$$H(f) = a_{M_R}(\theta_T(f))a_{M_T}^H(\theta_R(f))H_b(f) = \quad (63)$$

$$U_{M_R}^H H(f) U_{M_T} = [H_{b,i,m}(f)]_{i \in I(M_R), m \in I(M_T)}$$

$$H_{b,i,m}(f) = \frac{1}{\sqrt{M_R M_T}} D_{M_R}(\theta_R(f) - i\Delta\theta_R)D_{M_T}(\theta_T(f) - m\Delta\theta_T) \quad (64)$$

where $\theta_T$(f) and $\theta_R$(f) are related to $\theta_{T,o}$ and $\theta_{R,o}$, respectively as in equation (17) and $\Delta\theta_T=1/M_T$ and $\Delta\theta_R=1/M_R$ are the orthogonal beam spacings for the transmit and receive ULAs. The LoS path is associated with $\Delta_{ch,R}=M_R\alpha\theta_R$ beams at the receiver and $\Delta_{ch,T}=M_T\alpha\theta_T$ beams at the transmitter corresponding to a $\Delta_{ch,R} \times \Delta_{ch,T}$ sub-matrix of the beamspace matrix $H_b$(f). The channel matrix for a wideband multipath MIMO channel can be modeled as $$H(f) = \sum_{q=1}^{N_P} \beta_q a_{M_R}(\theta_{R,q}(f))a_{M_T}^H(\theta_{T,q}(f))e^{-j2\pi T_q f} \quad (65)$$

where $N_P$ denotes the number of paths, and the q-th path is associated with a path gain $\beta_q$, angle of departure $\phi_{T,q}$, angle of arrival $\phi_{R,q}$, and delay $T_q$. The physical angles ($\phi_{T,q}$, $\phi_{R,q}$) $\leftrightarrow$ ($\theta_{T,q}, \theta_{R,q}$) induce frequency-dependent beam angles ($\theta_{T,q}$(f),$\theta_{R,q}$(f)) as in (17). The beamspace representation of H(f) is given by $$H_b(f) = \quad (66)$$

$$U_{M_R}^H H(f) U_{M_T} = [H_{b,i,m}(f)]_{i \in I(M_R), m \in I(M_T)} H_{b,i,m}(f) = \frac{1}{\sqrt{M_R M_T}}$$

$$\sum_{q=1}^{N_p} \beta_q D_{M_R}(\theta_{R,q}(f) - i\Delta\theta_R)D_{M_T}(\theta_{T,q}(f) - m\Delta\theta_T)e^{-j2\pi T_q f}.$$

Transmit/receive channel dispersion factors can be defined for each path: $\Delta_{ch,T,q}=M_T\alpha\theta_{T,q}$ and $\Delta_{ch,R,q}=M_R\alpha\theta_{R,q}$. Each path is associated with $\Delta_{ch,R,q}$ beams at the receiver and $\Delta_{ch,T,q}$ beams at the transmitter captured by a corresponding $\Delta_{ch,R,q} \times \Delta_{ch,T,q}$ sub-matrix of the beamspace matrix $H_b$(f).

The MISO antenna domain and beamspace transmit signal vectors $\underline{X}$(f) and $\underline{X}_b$(f) are related to the transmit signal S(f) via $$\underline{X}(f)=\underline{G}_T(f)S(f) \quad (67)$$

$$\underline{X}_b(f)=\underline{G}_{T,b}(f)S(f) \quad (68)$$

where $\underline{G}_T$(f) and $\underline{G}_{T,b}$(f) are the antenna domain and beamspace space-time precoders respectively with $\|\underline{G}_T(f)\|^2 \leq 1$ and $\|\underline{G}_{T,b}(f)\|^2 \leq 1$. For a single information symbol s, the transmit signal is S(f)=s$\psi$(f). The receiver correlates R(f) with $\psi$(f) to obtain the sufficient statistic for detecting s as $$z = \int_{-\frac{W}{2}}^{\frac{W}{2}} R(f)\Psi^*(f)df = s\int_{-\frac{W}{2}}^{\frac{W}{2}} E(f)|\Psi(f)|^2 df + w \quad (69)$$

where $$E(f)=\underline{H}^H(f)\underline{G}_T(f)=\underline{H}_b^H(f)\underline{G}_{b,T}(f) \quad (70)$$

is the effective frequency response of the channel and precoder and $w \sim \mathcal{CN}(0,N_o)$ represents the noise. The optimal, phased array, and near optimal B-MIMO MISO precoders are $$\underline{G}_T^{opt}(f) = \frac{1}{\sqrt{M}} a_M(\theta(f)) \quad (71)$$

$$\underline{G}_T^{pa}(f) = \frac{1}{\sqrt{M}} a_M(\theta_O) \quad (72)$$

$$\underline{G}_{T,b}^{no}(f) = \begin{cases} \frac{1}{\sqrt{M}} H_{b,i}(f) & i \in \mathcal{M}_T \\ 0 & i \notin \mathcal{M}_T \end{cases} \quad (73)$$

where the transmit beam mask $\mathcal{M}_T$ is defined analogously to the receive beam mask $\mathcal{M}_R$ for the near optimal B-MIMO SIMO receiver, which results in effective frequency responses for each precoder $$E^{opt}(f) = \sqrt{M} \quad (74)$$

$$E^{pa}(f) = \frac{1}{\sqrt{M}} D_M\left(\theta_O \frac{f}{f_c}\right) \quad (75)$$

-continued $$E^{no}(f) = \frac{1}{M^{3/2}} \sum_{i \in \mathcal{M}} D_M^2(\theta(f) - i\Delta\theta). \quad (76)$$

For $p=|\mathcal{M}_T| \approx \Delta_{ch}$ $E^{no}(f) \approx \underline{M}$ and transmit signals $S(f)$ representing a packet of duration T consisting of $N \approx TW$ symbols with energy $\mathcal{E}_s$ modulated onto basis waveforms $\{\psi_l(t)\}_{l=0}^{N-1}$, the SINR of the sufficient statistics $\{z_l\}_{l=0}^{N-1}$ is $$SINR_l = \frac{\frac{E_s}{No}|A_l|^2}{\frac{E_s}{No}\sum_{l' \neq l}|B_{l,l'}|^2 + 1}. \quad (77)$$

The signal amplitude $A_l$ and interference $B_l$ terms for a given precoder with an associated effective frequency response are $$A_l = \int_{-\frac{W}{2}}^{\frac{W}{2}} E(f)|\Psi_l(f)|^2 df \quad (78)$$

$$B_{l,l'} = \int_{-\frac{W}{2}}^{\frac{W}{2}} E(f)\Psi_{l'}(f)\Psi_l^*(f) df. \quad (79)$$

The processing in LoS MIMO corresponds to simultaneously performing MISO precoding at the transmitter and SIMO combining at the receiver. As with the MISO precoder, the antenna domain and beamspace transmit signal vectors $\underline{X}(f)$ and $\underline{X}_b(f)$ are related to the transmit signal $S(f)$ using $$\underline{X}(f) = \underline{G}_T(f)S(f) \quad (80)$$

$$\underline{X}_b(f) = \underline{G}_{T,b}(f)S(f) \quad (81)$$

where for a single information symbol $S(f)=s\psi(f)$. At the receiver, the output of an antenna domain or beamspace combiner ($\underline{G}_R(f)$ or $\underline{G}_{R,b}(f)$) is correlated with $\psi(f)$ to obtain the sufficient statistic for detecting s:

$$z = \int_{-\frac{W}{2}}^{\frac{W}{2}} \underline{G}_R^H(f)\underline{R}(f)\Psi^*(f)df = \quad (82)$$

$$\int_{-\frac{W}{2}}^{\frac{W}{2}} \underline{G}_{R,b}^H(f)\underline{R}_b(f)\Psi^*(f)df = s\int_{-\frac{W}{2}}^{\frac{W}{2}} E(f)|\Psi(f)|^2 df + w$$

where $$E(f) = \underline{G}_R^H(f)H(f)\underline{G}_T(f) = \underline{G}_{R,b}^H(f)H_b(f)\underline{G}_{T,b}(f) \quad (83)$$

is the effective frequency response of the combiner, precoder, and channel, and $w \sim \mathcal{CN}(0, N_o \|\underline{G}_R(f)\psi(f)\|^2)$ is the noise. For the optimal, phased array, and near optimal B-MIMO MISO precoders and SIMO combiners, the effective frequency responses are $$E^{opt}(f) = \sqrt{M_R M_T} \quad (84)$$

$$E^{pa}(f) = \frac{1}{\sqrt{M_R M_T}} D_{M_R}\left(\theta_{o,R}\frac{f}{f_c}\right) D_{M_T}\left(\theta_{o,T}\frac{f}{f_c}\right) \quad (85)$$

$$E^{no}(f) = \quad (86)$$
$$\frac{1}{(M_R M_T)^{3/2}} \sum_{i \in \mathcal{M}_R} \sum_{m \in \mathcal{M}_T} D_{M_R}^2(\theta_R(f) - i\Delta\theta_R) D_{M_T}^2(\theta_T(f) - m\Delta\theta_T).$$

The B-MIMO transmit and receive beam masks $\mathcal{M}_T$ and $\mathcal{M}_R$ capture the $p_T |\mathcal{M}_T| \approx \Delta_{ch,T}$ dominant transmit beams and the $p_R = |\mathcal{M}_R| \approx \Delta_{ch,T}$ dominant receive beams where $\Delta_{ch,T}$ and $\Delta_{ch,R}$ are defined using equation (24). As with the SIMO and MIMO system, for transmit signals $S(f)$ representing a packet of duration T consisting of $N \approx TW$ symbols with energy $\mathcal{E}_s$ modulated onto basis waveforms $\{\psi_l(t)\}_{l=0}^{N-1}$, the SINR of the sufficient statistics $\{z_l\}_{l=0}^{N-1}$ is $$SINR_l = \frac{\frac{E_s}{No}|A_l|^2}{\frac{E_s}{No}\sum_{l' \neq l}|B_{l,l'}|^2 + \|G_R(f)\Psi_l(f)\|^2}. \quad (87)$$

The signal amplitude $A_l$ and interference $B_l$ terms for a given precoder with an associated effective frequency response are $$A_l = \int_{-\frac{W}{2}}^{\frac{W}{2}} E(f)|\Psi_l(f)|^2 df \quad (88)$$

$$B_{l,l'} = \int_{-\frac{W}{2}}^{\frac{W}{2}} E(f)\Psi_{l'}(f)\Psi_l^*(f) df. \quad (89)$$

For sparse multipath MIMO systems, the MISO precoding and SIMO combining are applied individually to each of the $N_p$ paths. The antenna domain and beamspace transmit signal vectors are $$\underline{X}(f) = \sum_{v=1}^{N_p} s_v G_{T,v}(f)\Psi(f) \quad (90)$$

$$\underline{X}_b(f) = \sum_{v=1}^{N_p} s_v G_{T,b,v}(f)\Psi(f) \quad (91)$$

where $G_{T,v}(f)$ and $G_{T,b,v}(f)$ are the antenna domain and beamspace MISO precoders for the v-th path. The receiver applies $N_p$ SIMO antenna domain or beamspace combiners for each path and correlates the output to obtain the sufficient statistics for detecting the $\{s_v\}_{v=1}^{N_p}$ as $$z_v = \int_{-\frac{W}{2}}^{\frac{W}{2}} \underline{G}_{R,v}^H(f)\underline{R}(f)\Psi^*(f)df = \int_{-\frac{W}{2}}^{\frac{W}{2}} \underline{G}_{R,b,v}^H(f)\underline{R}_b(f)\Psi^*(f)df = \quad (92)$$

$$\sum_{v=1}^{N_p} s_v \int_{-\frac{W}{2}}^{\frac{W}{2}} E_{v,v'}(f)|\Psi(f)|^2 df + w_v$$

where $$E_{v,v'}(f) = \underline{G}_{R,v}^H(f)H(f)\underline{G}_{T,v'}(f) = \underline{G}_{R,b,v}^H(f)H_b(f)\underline{G}_{T,b,v'}(f) \quad (93)$$

is the effective frequency response of the v-th combiner, v'-th precoder, and channel and $w_v \sim \mathcal{CN}(0, N_o \|\underline{G}_{R,v}(f)\psi(f)\|^2)$ represents noise. For the optimal, phased array, and near optimal B-MIMO MISO precoder and SIMO combiner, the effective frequency responses are $$E_{v,v'}^{opt}(f) = \frac{1}{\sqrt{M_T M_R}} \quad (94)$$

$$\sum_{q=1}^{N_p} \beta_q D_{M_R}(\theta_{R,v}(f) - \theta_{R,q}(f)) D_{M_T}(\theta_{T,v'}(f) - \theta_{T,q}(f)) e^{-j2\pi T_q f}$$

$$E_{v,v'}^{pa}(f) = \quad (95)$$

$$\frac{1}{\sqrt{M_T M_R}} \sum_{q=1}^{N_p} \beta_q D_{M_R}(\theta_{R,v} - \theta_{R,q}(f)) D_{M_T}(\theta_{T,v'} - \theta_{T,q}(f)) e^{-j2\pi T_q f}$$

$$E_{v,v'}^{no}(f) = \frac{1}{(M_T M_R)^{\frac{3}{2}}} \quad (96)$$

$$\sum_{q=1}^{N_p} \sum_{i \in \mathcal{M}_R} \sum_{M \in \mathcal{M}_T} \beta_q D_{M_R}(\theta_{R,v}(f) - i\Delta\theta_R) D_{M_R}(\theta_{R,q}(f) - i\Delta\theta_R)$$

$$D_{M_T}(\theta_{T,v'}(f) - m\Delta\theta_T) D_{M_T}(\theta_{R,q}(f) - m\Delta\theta_T) e^{-j2\pi \tau_q f}.$$

Here the B-MIMO transmit and receive beam masks are $$M_T = U_{v'=1}^{N_p} M_{T,v'}$$

and $$M_R = U_{v=1}^{N_p} M_{R,v}$$

where $\mathcal{M}_{T,v}$ and $\mathcal{M}_{T,v}$ are defined for each path as in the LoS channel. In sparse systems, the $N_p$ paths are sufficiently separated so that the $$\{M_{T,v'}\}_{v'=1}^{N_p}$$

and $$\{M_{R,v}\}_{v=1}^{N_p}$$

are disjoint. So the summation terms in each of the $E_{v,v'}(f)$ (94)-(96) are only approximately nonzero for $v=v'=q$ resulting in $E_{v,v'} \approx 0$ and for $v'=v$ and $$E_{v,v}^o(f) \approx \beta_v \sqrt{M_R M_T} e^{-j2\pi \tau_v f} \quad (97)$$

$$E_{v,v}^{pa}(f) \approx \frac{\beta_v}{\sqrt{M_R M_T}} D_{M_R}\left(\theta_{o,R} \frac{f}{f_c}\right) D_{M_T}\left(\theta_{o,T} \frac{f}{f_c}\right) e^{-j2\pi \tau_v f} \quad (98)$$

$$E_{v,v}^{no}(f) \approx \frac{\beta_v}{(M_R M_T)^{\frac{3}{2}}} \quad (99)$$

$$\sum_{i \in \mathcal{M}_R} \sum_{m \in \mathcal{M}_T} D_{M_R}^2(\theta_{R,v}(f) - i\Delta\theta_R) D_{M_T}^2(\theta_{T,v}(f) - m\Delta\theta_T) e^{-j2\pi \tau_v f}.$$

Comparing these expressions for $E_{v,v}(f)$ to the wideband LoS MIMO expressions for $E(f)$ (see equation (86)), other than the path gains and the linear phase shift caused by the path delays, wideband multipath MIMO systems with sufficiently separated paths are approximately equivalent to $N_p$ LoS MIMO channels with the SINR for each path defined according to equation (87) using the appropriate $E_{v,v}(f)$ to calculate the $A_l$ and $B_{l,l'}$.

The nature of space-time processing at the transmitter and/or receiver for single-path LoS (or sparse multipath) SIMO, MISO, and MIMO channels has been defined. As noted earlier, the main feature of wideband high-dimensional systems is that each path gets mapped to multiple beams at the transmitter and/or receiver, and wideband space-time communication occurs over the active set of beams at the transmitter and/or receiver.

For illustration, in a multiuser MIMO system, in which a base station equipped with an M-element array is communicating with K single-antenna mobile user devices over a sufficiently large bandwidth (which may still be less than a 10% fractional bandwidth) so that channel dispersion factor associated with each user is at least one so that wideband processing is used. In practice, communication occurs in two phases: a channel estimation phase, followed by a data communication phase. In the channel estimation phase, the dominant set of beams that need to be processed at the base station are determined. This can be done using sequential transmissions from different mobile user devices, one set at the center (carrier) frequency, one set at the lowest frequency in the band, and one set at the highest frequency in the band. With these measurements, a beamspace mask can be determined for the corresponding mobile user device as the set of beams that carry significant power over the span of frequencies in the bandwidth. A complete beamspace-frequency response matrix can be determined for each mobile user device: that is, the gains and phases for each beam in the mask and over all frequencies (e.g., all tones/carriers in an OFDM system). Once the beamspace-frequency response matrices have been estimated at the base station for each mobile user device, they can be used to determine the beamspace-frequency processing/filtering at the base station for suppressing any interference between the mobile user device signals in the communication phase. For example, a minimum mean squared error criterion can be used for determining the beamspace-frequency precoding at the base station for downlink transmissions from the base station to a specific mobile user device, or for determining the beamspace-frequency processing at the base station for uplink transmissions from the specific mobile user device to the base station.

Figure 10:
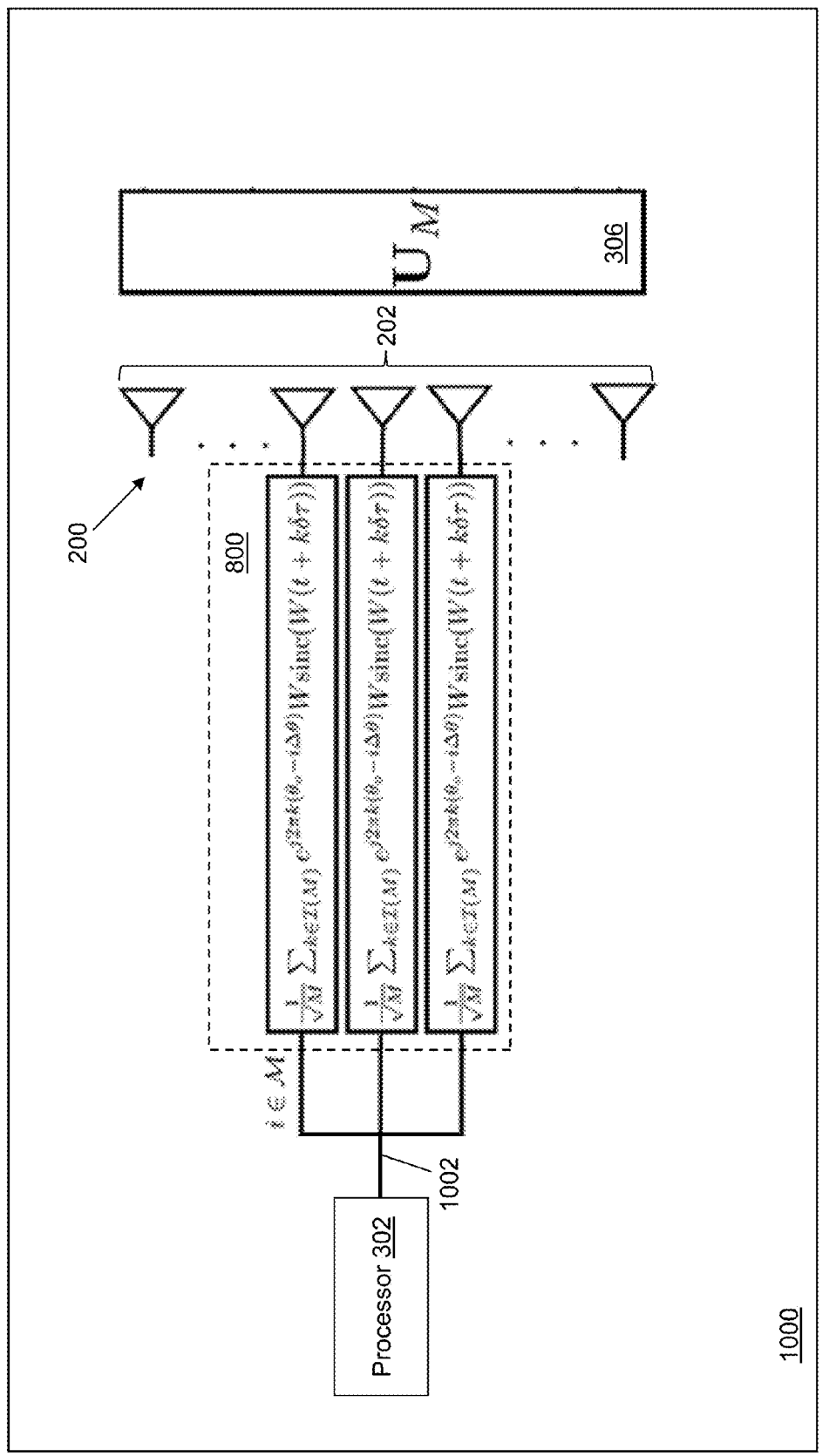
FIG. 10 shows a near optimal, low-complexity transmitter implementation of the transmitting transceiver in accordance with an illustrative embodiment.

An illustrative beamforming matrix 306 implemented in analog passband is described in Hybrid Analog-Digital Phased MIMO Transceiver System, U.S. Pat. No. 8,811,511 (filed Sep. 28, 2010), that is assigned to the assignee of the present application and that is incorporated herein by reference in its entirety. Referring to FIG. 10, a transmitter 1000, for example of a transmitting transceiver, includes processor 302, the bank of filters 800, array 202, and beamforming matrix 306, $U_M$. The plurality of antennas 200 of array 202 may receive a first signal to compute the columns of beamforming matrix 306, $U_M$. Processor 302 may form a signal 1002 that includes one or more information symbols that is sent to the bank of filters 800. The bank of filters 800 may be defined in the frequency domain according to equation (73) based on the selected second plurality of beams p, i∈M. For each beam of the selected second plurality of beams as a first beam, a spatial phase shift component and a temporal delay component are computed based on the fixed spatial angle associated with the first beam and the carrier frequency to define the bank of filters 800.

Signal 1002 is filtered through each filter of the bank of filters 800. The filtered signals are provided to the plurality of antennas 200 of array 202 which radiate the filtered signals towards beamforming matrix 306. Beamforming matrix 306 radiates the transmit signal towards the receiver at a receiving transceiver. Beamforming matrix 306 may be implemented using a lens such as a discrete lens array.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A method of processing a communication signal, the method comprising:
   receiving a signal by a plurality of antennas;
   computing, by a processor, a plurality of beam measurement values by transforming the signal received from each antenna of the plurality of antennas to a beam-space representation using a beamforming matrix, wherein the beamforming matrix includes a plurality of columns, wherein each column of the plurality of columns defines a steering vector for a beam that corresponds to a fixed spatial angle relative to a boresight vector extending from the plurality of antennas, wherein the plurality of columns thereby define a plurality of beams;
   selecting, by the processor, a second plurality of beams from the defined plurality of beams based on a power captured by each beam of the plurality of beams that is derived from the computed plurality of beam measurement values;
   for each beam of the selected second plurality of beams as a first beam,
      computing, by the processor, a spatial phase shift component based on the fixed spatial angle defined for the first beam and a carrier frequency;
      computing, by the processor, a temporal delay component based on the fixed spatial angle defined for the first beam and the carrier frequency;
      defining, by the processor, a filter using the computed spatial phase shift component and the computed temporal delay component;
      selecting, by the processor, a beam measurement value associated with the first beam from the computed plurality of beam measurement values; and
      applying, by the processor, the defined filter to the selected beam measurement value to define a filtered value; and
   combining the defined filtered values to extract information contained in the received signal.

2. The method of claim 1, wherein the second plurality of beams includes at least three beams.

3. The method of claim 1, wherein the second plurality of beams are selected using $\mathcal{M} = \{i \in I(M) : \sigma_i^2 \geq \gamma\}$, where M is a number of the plurality of antennas, $\sigma_i^2$ is a channel power captured by an $i^{th}$ beam of the plurality of beams and γ is a pre-defined threshold.

4. The method of claim 1, wherein the second plurality of beams are selected based on an angle of a transmitter of the signal relative to the boresight vector.

5. The method of claim 1, wherein the second plurality of beams are selected as $\Delta_{ch} = M\alpha|\theta_o|$, where $\Delta_{ch}$ is a number of the second plurality of beams, M is a number of the plurality of antennas, α is a fractional bandwidth of the received signal, and $$\theta_o = \frac{d}{\lambda_c} \sin(\phi_o),$$

where d is a spatial distance between adjacent antennas of the plurality of antennas, $\lambda_c$ is a wavelength at the carrier frequency, and $\phi_o$ is an angle of a transmitter of the signal relative to the boresight vector.

6. The method of claim 1, wherein the spatial phase shift component is computed using $e^{j2\pi k(\theta_o - i\Delta\theta)}$, where k is an antenna index value, $$\theta_o = \frac{d}{\lambda_c} \sin(\phi_o),$$

where d is a spatial distance between adjacent antennas of the plurality of antennas, $\lambda_c$ is a wavelength at the carrier frequency, $\phi_o$ is an angle of a transmitter of the signal relative to the boresight vector, i is a beam index value to the first beam, and $\Delta\theta = 1/M$, where M is a number of the plurality of antennas.

7. The method of claim 6, wherein the temporal delay component is computed as $$\tau_k = \frac{k\theta_o}{f_c},$$

where $f_c$ is the carrier frequency.

8. The method of claim 7, wherein the filter is defined using $$\frac{1}{\sqrt{M}} \sum_{k \in I(M)} e^{j2\pi k(\theta_o - i\Delta\theta)} W \text{sinc}(W(t + \tau_k)),$$

where W is a bandwidth of the signal and t is a time.

9. A receiver comprising:
a plurality of antennas configured to receive a signal; and
a processor configured to
compute a plurality of beam measurement values by transforming the signal received from each antenna of the plurality of antennas to a beamspace representation using a beamforming matrix, wherein the beamforming matrix includes a plurality of columns, wherein each column of the plurality of columns defines a steering vector for a beam that corresponds to a fixed spatial angle relative to a boresight vector extending from the plurality of antennas, wherein the plurality of columns thereby define a plurality of beams;
select a second plurality of beams from the defined plurality of beams based on a power captured by each beam of the plurality of beams that is derived from the computed plurality of beam measurement values;
for each beam of the selected second plurality of beams as a first beam,
compute a spatial phase shift component based on the fixed spatial angle defined for the first beam and a carrier frequency;
compute a temporal delay component based on the fixed spatial angle defined for the first beam and the carrier frequency;
define a filter using the computed spatial phase shift component and the computed temporal delay component;
select a beam measurement value associated with the first beam from the computed plurality of beam measurement values; and
apply the defined filter to the selected beam measurement value to define a filtered value; and
combine the defined filtered values to extract information contained in the received signal.

10. The receiver of claim 9, wherein the second plurality of beams includes at least three beams.

11. The receiver of claim 9, wherein the second plurality of beams are selected using $\mathcal{M} = \{i \in I(M): \sigma_i^2 \geq \gamma\}$, where M is a number of the plurality of antennas, $\sigma_i^2$ is a channel power captured by an $i^{th}$ beam of the plurality of beams and $\gamma$ is a pre-defined threshold.

12. The receiver of claim 9, wherein the second plurality of beams are selected based on an angle of a transmitter of the signal relative to the boresight vector.

13. The receiver of claim 9, wherein the second plurality of beams are selected as $\Delta_{ch} = M\alpha|\theta_o|$, where $\Delta_{ch}$ is a number of the second plurality of beams, M is a number of the plurality of antennas, $\alpha$ is a fractional bandwidth of the received signal, and $$\theta_o = \frac{d}{\lambda_c} \sin(\phi_o),$$

where d is a spatial distance between adjacent antennas of the plurality of antennas, $\lambda_c$ is a wavelength at the carrier frequency, and $\phi_o$ is an angle of a transmitter of the signal relative to the boresight vector.

14. The receiver of claim 9, wherein the spatial phase shift component is computed using $e^{j2\pi k(\theta_o - i\Delta\theta)}$, where k is an antenna index value, $$\theta_o = \frac{d}{\lambda_c} \sin(\phi_o),$$

where d is a spatial distance between adjacent antennas of the plurality of antennas, $\lambda_c$ is a wavelength at the carrier frequency, $\phi_o$ is an angle of a transmitter of the signal relative to the boresight vector, i is a beam index value to the first beam, and $\Delta\theta = 1/M$, where M is a number of the plurality of antennas.

15. The receiver of claim 14, wherein the temporal delay component is computed as $$\tau_k = \frac{k\theta_o}{f_c},$$

where $f_c$ is the carrier frequency.

16. The receiver of claim 15, wherein the filter is defined using $$\frac{1}{\sqrt{M}} \sum_{k \in I(M)} e^{j2\pi k(\theta_o - i\Delta\theta)} W \text{sinc}(W(t + \tau_k)),$$

where W is a bandwidth of the signal and t is a time.

17. A transmitter comprising:
a plurality of antennas configured to receive a first signal and to transmit a second signal; and
a processor configured to
compute a plurality of beam measurement values by transforming the first signal to a beamspace representation using a beamforming matrix, wherein the beamforming matrix includes a plurality of columns, wherein each column of the plurality of columns defines a steering vector for a beam that corresponds to a fixed spatial angle relative to a boresight vector extending from the plurality of antennas, wherein the plurality of columns thereby define a plurality of beams;
select a second plurality of beams from the defined plurality of beams based on a power captured by each beam of the plurality of beams that is derived from the computed plurality of beam measurement values;
for each beam of the selected second plurality of beams as a first beam,
compute a spatial phase shift component based on the fixed spatial angle defined for the first beam and a carrier frequency;
compute a temporal delay component based on the fixed spatial angle defined for the first beam and the carrier frequency; and
define a filter using the computed spatial phase shift component and the computed temporal delay component;
filter a transmit signal through each of the defined filters; and
provide the filtered transmit signal to the beamforming matrix as part of forming the second signal.

18. The transmitter of claim 17, wherein the second plurality of beams are selected as $\Delta_{ch}=M\alpha|\theta_o|$, where $\Delta_{ch}$ is a number of the second plurality of beams, M is a number of the plurality of antennas, $\alpha$ is a fractional bandwidth of the received signal, and $$\theta_o = \frac{d}{\lambda_c}\sin(\phi_o),$$

where d is a spatial distance between adjacent antennas of the plurality of antennas, $\lambda_c$ is a wavelength at the carrier frequency, and $\phi_o$ is an angle of a transmitter of the signal relative to the boresight vector.

19. The transmitter of claim 17, wherein the second plurality of beams are selected using $\mathcal{M}=\{i\in I(M):\sigma_i^2\geq\gamma\}$, where M is a number of the plurality of antennas, $\sigma_i^2$ is a channel power captured by an $i^{th}$ beam of the plurality of beams and $\gamma$ is a pre-defined threshold.

20. The transmitter of claim 17, wherein the beamforming matrix is implemented as a lens, wherein the filtered signal is provided to the lens by radiating the filtered signal from the plurality of antennas.

\* \* \* \* \*